US009152503B1

(12) United States Patent  
Fair

(10) Patent No.: US 9,152,503 B1  
(45) Date of Patent: *Oct. 6, 2015

(54) SYSTEM AND METHOD FOR EFFICIENTLY CALCULATING STORAGE REQUIRED TO SPLIT A CLONE VOLUME

(75) Inventor: Robert L. Fair, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 1048 days.

This patent is subject to a terminal disclaimer.

(21) Appl. No.: 12/783,664

(22) Filed: May 20, 2010

Related U.S. Application Data

(63) Continuation of application No. 11/082,098, filed on Mar. 16, 2005, now Pat. No. 7,757,056.

(51) Int. Cl.  
*G06F 12/00* (2006.01)  
*G06F 11/14* (2006.01)

(52) U.S. Cl.  
CPC .................. *G06F 11/1448* (2013.01)

(58) Field of Classification Search  
CPC .................. G06F 11/1446–11/1453  
USPC .......................................... 711/170  
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,843,541 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,916,608 A | 4/1990 | Shultz | |
| 4,989,206 A | 1/1991 | Dunphy, Jr. et al. | |
| 5,124,987 A | 6/1992 | Milligan et al. | |

(Continued)

FOREIGN PATENT DOCUMENTS

| | | |
|---|---|---|
| EP | 1349088 A2 | 1/2003 |
| WO | WO 89/10594 | 11/1989 |

(Continued)

OTHER PUBLICATIONS

Klivansky, Miroslav; "A Thorough Introduction to FlexClone Volumes"; Oct. 2004.*

(Continued)

*Primary Examiner* — Aimee Li  
*Assistant Examiner* — Prasith Thammavong  
(74) *Attorney, Agent, or Firm* — Cesari and McKenna, LLP

(57) ABSTRACT

A system and method efficiently calculates an estimated amount of storage required to split a clone volume from its parent volume. The system and method is illustratively embodied as a command line interface (CLI) command, i.e., a clone split estimate command, executed by an estimation module of a storage system. Notably, the estimation module cooperates with a file system of the storage system to quickly access data structures containing information used to perform the storage calculation without the need to access each block of the clone and parent volumes.

29 Claims, 15 Drawing Sheets

(56) References Cited

U.S. PATENT DOCUMENTS

| | | | |
|---|---|---|---|
| 5,129,088 | A | 7/1992 | Auslander et al. |
| RE34,100 | E | 10/1992 | Hartness |
| 5,155,835 | A | 10/1992 | Belsan |
| 5,163,131 | A | 11/1992 | Row et al. |
| 5,202,979 | A | 4/1993 | Hillis et al. |
| 5,278,979 | A | 1/1994 | Foster et al. |
| 5,355,453 | A | 10/1994 | Row et al. |
| 5,403,667 | A | 4/1995 | Simoens |
| 5,426,747 | A | 6/1995 | Weinreb et al. |
| 5,485,579 | A | 1/1996 | Hitz et al. |
| 5,511,177 | A | 4/1996 | Kagimasa et al. |
| 5,568,629 | A | 10/1996 | Gentry et al. |
| 5,581,724 | A | 12/1996 | Belsan et al. |
| 5,764,972 | A | 6/1998 | Crouse et al. |
| 5,802,366 | A | 9/1998 | Row et al. |
| 5,819,292 | A | 10/1998 | Hitz et al. |
| 5,828,876 | A | 10/1998 | Fish et al. |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,038,570 | A | 3/2000 | Hitz et al. |
| 6,052,758 | A | 4/2000 | Crockett et al. |
| 6,061,770 | A | 5/2000 | Franklin |
| 6,065,037 | A | 5/2000 | Hitz et al. |
| 6,081,875 | A | 6/2000 | Clifton et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,275,898 | B1 | 8/2001 | DiKoning |
| 6,311,193 | B1 | 10/2001 | Sekido |
| 6,341,341 | B1 | 1/2002 | Grummon et al. |
| 6,425,035 | B2 | 7/2002 | Hoese et al. |
| 6,516,380 | B2 | 2/2003 | Kenchammana-Hoskote et al. |
| 6,526,478 | B1 | 2/2003 | Kirby |
| 6,530,035 | B1 | 3/2003 | Bridge |
| 6,574,591 | B1 | 6/2003 | Kleiman et al. |
| 6,604,118 | B2 | 8/2003 | Kleiman et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,721,764 | B2 | 4/2004 | Hitz et al. |
| 6,868,417 | B2 | 3/2005 | Kazar et al. |
| 6,907,505 | B2 | 6/2005 | Cochran et al. |
| 6,976,145 | B1 | 12/2005 | Bradford |
| 7,035,881 | B2 | 4/2006 | Tummala et al. |
| 7,085,785 | B2 | 8/2006 | Sawdon et al. |
| 7,100,089 | B1 | 8/2006 | Phelps |
| 7,127,577 | B2 | 10/2006 | Koning et al. |
| 7,194,597 | B2 | 3/2007 | Willis et al. |
| 7,334,094 | B2 | 2/2008 | Fair |
| 7,334,095 | B1 | 2/2008 | Fair et al. |
| 7,409,494 | B2 | 8/2008 | Edwards et al. |
| 7,430,571 | B2 | 9/2008 | Edwards |
| 7,437,360 | B1 | 10/2008 | Chitre et al. |
| 7,454,445 | B2 | 11/2008 | Lewis et al. |
| 7,457,982 | B2 | 11/2008 | Rajan |
| 7,757,056 | B1 | 7/2010 | Fair |
| 2003/0061366 | A1 | 3/2003 | Musante et al. |
| 2003/0195903 | A1 | 10/2003 | Manley et al. |
| 2004/0030668 | A1 | 2/2004 | Pawlowski et al. |
| 2004/0260673 | A1* | 12/2004 | Hitz et al. ............ 707/1 |
| 2005/0086445 | A1 | 4/2005 | Mizuno et al. |
| 2005/0246397 | A1 | 11/2005 | Edwards et al. |
| 2005/0246401 | A1 | 11/2005 | Edwards et al. |
| 2005/0246503 | A1 | 11/2005 | Fair |
| 2006/0085608 | A1* | 4/2006 | Saika ............ 711/162 |
| 2007/0088702 | A1 | 4/2007 | Fridella et al. |

FOREIGN PATENT DOCUMENTS

| | | |
|---|---|---|
| WO | WO-02/065275 A1 | 8/2002 |
| WO | WO-03/105026 A1 | 12/2003 |
| WO | WO-2004/015521 A3 | 2/2004 |

OTHER PUBLICATIONS

Administration Guide found at http://www.openafs.org/pages/doc/AdminGuide/auagd010.htm, visited on Mar. 2, 2005.

Akyurek, Sedat, Placing Replicated Data to Reduce Seek Delays, Department of Computer Science, University of Maryland, UMIACS-TR-91-121, CS-TR-2746, Aug. 1991.

Asante Desktop EN/SC Adapter's User's Manual, published by Asante Technologies Inc., Apr. 1996, 29 pages.

Asante EN/SC Adapter Family Installation Guide. Published by Asante Technologies Inc., May 1994, 60 pages.

Basilico, et al., Error Correction System Using "Shadow Memory," IBM Technical Disclosure Bulletin, May 1994, pp. 5792-5793.

Bitton, Dina, Disk Shadowing, Proceedings of the 14th VLDB Conference, LA, CA 1988.

Blasgen, M.W. et al., System R: An architectural Overview, Reprinted from IBM Systems Journal vol. 20, No. 1, 1981 © 1981, 1999.

Borenstein, Nathaniel S., CMU's Andrew project a retrospective, Communications of ACM, (39)12, Dec. 1996.

Brown, Mark R. et al., The Alpine file system, ACM Transactions on Computing Systems, 3(4):261-293, Nov. 1985.

Callaghan B., "NFS Version 3 Protocol Specification", Request for Comments (RFC) 1813, Jun. 1995, 188 pages.

Celerra File Server Architecture for High Availability, published by EMC Corporation, Aug. 1999, pp. 1-7.

Chaudhuri, Surajit, et al., Self-Tuning Technology in Microsoft SQL Server, Data Engineering Journal 22, 2 1999 pp. 20-27.

Chen, Peter M., et al., An Evaluation of Redundant Arrays of Disks Using an Amdahl 5890 Performance Evaluation, pp. 74-85, 1990.

Chutani, Sailesh, et al., The Episode File System, In Proceedings of the USENIX Winter 1992.

Clark, B.E., et al., Application System /400 Performance Characteristics, IBM Systems Journal, 28(3): 407-423, 1989.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Coyne, Robert A., et al., Storage Systems for National Information Assets, Proc. Supercomputing 92, Minneapolis, Nov. 1992, pp. 626-633.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., A comparison of two distributed systems: Amoeba and Sprite—Computing Systems, 4(4), Fall 1991, pp. 353-385.

Fielding et al., "Hypertext Transfer Protocol—HTTP/1.1" Request for Comments (RFC) 2616, Jun. 1999, 143 pages.

Finlayson, Ross S., et al., Log Files: An Extended File Service Exploiting Write-Once Storage Department of Computer Science, Stanford University, Report No. STAN-CS-87-1177, Sep. 1987.

Gait, Jason, Phoenix: A Safe In-Memory File System. Communications of the ACM, 33(1):81--86, Jan. 1990.

Gray, Jim, et al., The Recovery Manager of the System R Database Manager, ACM Computing Surveys, (13)2:223-242 1981.

Hartman, John H. et al., Performance Measurements of a Multiprocessor Sprite Kernel, Proceedings of the USENIX Conference, 1990.

Hecht, Matthew S., et al. Shadowed Management of Free Disk Pages with a Linked List, ACM Transactions on Database Systems, 8/4, Dec. 1983, pp. 503-514.

Hitz, Dave et al., File System Design for an NFS File Server Appliance, Technical Report 3002, Rev. C395, presented Jan. 19, 1994.

(56) References Cited

OTHER PUBLICATIONS

Hitz, David, et al. System and Method for Enabling a Storage System to Support Multiple Volume Formats Simultaneously, U.S. Appl. No. 60/652,626. Feb. 14, 2005.
Howard, John H, et al. Scale and Performance in a Distributed File System, Carnegie Mellon University, CMU-ITC-87-068, Aug. 5, 1987.
Howard, John, H. et al., Scale and performance in a distributed file system, ACM Trans. Computer. System., 6(1), Feb. 1998 pp. 51-81.
Howard, John H., An Overview of the Andrew File System, Carnegie Mellon University, CMU-ITC-88-062.
The IBM System/38, Chapter 8, pp. 137-215.
Isomaki, Markus, Differentiated Service for the Internet, Department of Technical Physics and Mathematics, May 9, 1998.
Kazar, Michael Leon, Synchronization and Caching Issues in the Andrew File System, Carnegie Mellon University, CMU-ITC-88-063.
Kazar, Michael L., et al., DEcorum File System Architectural Overview, USENIX Summer Conference, Anaheim, California, 1990.
Kemper, Alfons, et al., Performance Tuning for SAP R/3, Data Engineering Journal 22, 2 1999 pp. 33-40.
Kent, Jack et al., Optimizing Shadow Recovery Algorithms, IEEE Transactions on Software Engineering, 14(2): 155-168, Feb. 1988.
Kistler, et al., Disconnected Operation in the Coda File System, ACM Transactions on Computer Systems, vol. 10, No. 1, Feb. 1992, pp. 3-25.
Levine, Ron et al., "Building a SAN", SunExpert Magazine, Mar. 1999, pp. 50-64.
"LFS—A Local File System for Multiprocessor NFS Network Servers", published by Auspex Systems, 1994, 6 pages.
Lomet, David., et al., The performance of a multiversion access method, ACM SIGMOD International Conference on Management of Data, 19:353-363.
Lorie, Raymond, A, Physical integrity in a large segmented database, ACM Trans. Database Systems, (2)1: 91-104, Mar. 1977.
Lorie, RA, Shadow Page Mechanism, IBM Technical Disclosure Bulletin, Jun. 1986, pp. 340-342.
Lu, Yingping et al., "Performance Study of iSCSI-Based Storage Subsystems", IEEE Communications Magazine, pp. 76-82, Aug. 2003.
Maintenance Procedures ND (8C), nd-network disk control, published by SunOS 5.9, Last change: Feb. 1, 1985, 1 page.
McKusick, Marshall Kirk, et al., A Fast File System for UNIX, Computer Science Division, Department of Electrical Engineering and Computer Sciences, Univ. of CA, Berkley, Feb. 18, 1994.
Miller, Ethan L., et al., RAMA:A File System for Massively Parallel Computers, 12th IEEE Symposium on Mass Storage Systems, Monterey CA, Apr. 1993, pp. 163-168.
Moons, Herman et al., Location-Independent Object Invocation in Open Distributed Systems, Autumn 1991 EurOpen Technical Conference and Exhibition, pp. 287-300 (Sep. 16-20, 1991).
Morris, James H., et al, Andrew: A Distributed Personal Computing Environment, Comm. of the ACM, vol. 29, Mar. 1986, pp. 184-201.
Mullender, Sape J., et al., A distributed file service based on optimistic concurrency control, ACM Symposium on Operating System Principles (Orcas Island, Washington). Published as Operating Systems Review, 19(5):51-62, Dec. 1985.
Muller, Keith, et al., A High Performance Multi-Structured File System Design, In Proceedings of the 13th ACM Symposium on Operating Systems Principles, Oct. 1991, pp. 56-67.
"Network Appliance Ends NAS-SAN War", by Computerwire, http://www.theregister.co.uk/2002/10/02/network_appliance_ends_nassan_war/; published Oct. 2, 2002, 2 pages.
"Notification of Transmittal of the International Search Report and the Written Opinion of the International Searching Authority, or the Declaration", for International Application No. PCT/US2005/013414 for International Filing Date of Apr. 21, 2005.
Ousterhout, John K. et al., The Sprite Network Operating System, Computer Science Division, Computer Science Division, Department of Electrical Engineering and Computer Sciences, Univ. of CA, Berkley, Nov. 19, 1987.
Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.
Ousterhout, John, Why Aren't Operating Systems Getting Faster as Fast as Hardware?, Digital WRL Technical Note TN-11, Oct. 1989.
Ousterhout, John, A Brief Retrospective on the Sprite Network Operating System, found at http://www.cs.berkeley.edu/projects/sprite/retrospective.html, visited on Mar. 11, 2005.
Patterson, D., et al., A Case for Redundant Arrays of Inexpensive Disks (RAID), Technical Report, CSD-87-391, Computer Science Division, Electrical Engineering and Computer Sciences, University of California at Berkeley 1987.
Patterson, D., et al., A Case for Redundant Arrays of Inexpensive Disks (RAID), SIGMOD International Conference on Management of Data, Chicago, IL, USA, Jun. 1-3, 1988, SIGMOD RECORD (17)3:109-16 Sep. 1988.
"Performance Without Compromise: The Virtual Storage Architecture", published by Storage Computer Corporation, 1997, 11 pages.
Peterson, Zachary Nathaniel Joseph, Data Placement for Copy-on-Write Using Virtual Contiguity, University of CA, Santa Cruz, Master's Thesis for the Department of Science in Computer Science, Sep. 2002.
Quinlan, Sean, A Cached WORM File System, Software-Practice and Experience, 21(12):1289-1299 1991.
Redundant Array of Independent Disks, from Wikipedia, the free encyclopedia, found at http://en.wikipedia.org/wiki/RAID, visited on Mar. 9, 2005.
Rosenberg, J., et al., Stability in a Persistent Store Based on a Large Virtual Memory, In Security and Persistence, Rosenber, J. & Keedy, J.L. (ed), Springer-Verlag (1990) pp. 229-245.
Rosenblum, Mendel, et al., The LFS Storage Manager, Computer Science Division, Electrical Engineering and Computer Sciences, Univ. of CA, presented at Summer '90 USENIX Technical Conference, Anaheim, CA Jun. 1990.
Rosenblum, Mendel, et al. The Design and Implementation of a Log-Structured File System Jul. 24, 1991 pp. 1-15.
Rosenblum, Mendel, The Design and Implementation of a Log-Structured File System, 1992 pp. 1-93.
Rosenblum, Mendel, et al., The Design and Implementation of a Log-Structured File System, In Proceedings of ACM Transactions on Computer Systems, (10)1:26-52, Feb. 1992.
Sandberg, Russel et al., Design and implementation of the Sun Network Filesystem. In Proc. Summer 1985 USENIX Conf., pp. 119-130, Portland OR (USA), Jun. 1985.
Santry, Douglas S., et al., Deciding When to Forget in the Elephant File System, Operating Systems Review, 34(5), (Dec. 1999) pp. 110-123.
Satyanarayanan, M., et al., The ITC Distributed File System: Principles and Design, In Proceedings of the 10th ACM Symposium on Operating Systems Principles, (19)5:56-67, Dec. 1985.
Satyanarayanan,.M.. A survey of distributed file-systems. Annual Review of Computing Science, 4(73-104), 1989.
Satyanarayanan, M., et al, Coda: A highly available file system for a distributed workstation environment Carnegie Mellon University, CMU-ITC.
Satyanarayanan, M., et al, Coda: A highly available file system for a distributed workstation environment. IEEE Transactions on Computers, 39(4):447-459, 1990.
Satyanarayanan, Mahadev, Scalable, Secure, and Highly Available Distributed File Access, Computer May 1990: 9-21.
Schiefer, Berni, et al., DB2 Universal Database Performance Tuning, Data Engineering Journal 22, 2 1999 pp. 12-19.
Seltzer, Margo I., et al., Journaling Versus Soft Updates: Asynchronous Meta-Data Protection in File Systems, Proceedings of 200 USENIX Annual Technical Conference, Jun. 18-23, 2000.
Shasha, Dennis, Tuning Time Series Queries in Finance: Case Studies and Recommendations, Data Engineering Journal 22, 2 1999 pp. 41-47.

(56) References Cited

OTHER PUBLICATIONS

Sidebotham, Bob, Volumes: The Andrew File System Data Structuring Primitive, EEUG Conference Proceedings, Manchester, UK, Autumn 1986.

Subramanian, Muralidhar, et al., Performance Challenges in Object-Relational DBMSs, Data Engineering Journal 22, 2 1999 pp. 28-32.

Thomas, Roger, International Search Report for PCT/US2005/013696, Apr. 7, 2006.

Unix Workstation System Administration Education Certificate Course, published by the Trustees of Indiana University, Last Modified: Jan. 8, 2002, 22 pages.

User Guide found at http://www.openafs.org/pages/doc/UserGuide/auusg004.htm, visited on Mar. 2, 2005.

Weikum, Gerhard, et al., Towards Self-Tuning Memory Management for Data Servers, Data Engineering Journal 22, 2 1999 pp. 3-11.

Welch, Brent B., et al., Pseudo Devices: User-Level Extensions to the Sprite File System, Computer Science Division, Department of Electrical Engineering and Computer Sciences, Univ. of CA, Berkley, Apr. 1988.

Welch, Brent B., et al., Pseudo-File-Systems, Computer Science Division, Department of Electrical Engineering and Computer Sciences, Univ. of CA, Berkley, Oct. 1989.

West, Michael, et al. The ITC Distributed File System: Prototype and Experience, Carnegie-Mellon University, Technical Report CMU-ITC-040, Mar. 1985.

Wittle, Mark, et al, LADDIS: The next generation in NFS file server benchmarking, USENIX Association Conference Proceedings, Apr. 1993.

Zayas, Edward R., AFS-3 Programmer's Reference: Architectural Overview, Transarc Corporation, Pittsburgh, PA, 1.0 edition 1991.

Microsoft Computer Dictionary, 2002, Microsoft Press, Fifth Edition, p. 104.

* cited by examiner

SYSTEM AND METHOD FOR EFFICIENTLY CALCULATING STORAGE REQUIRED TO SPLIT A CLONE VOLUME

CROSS-REFERENCE TO RELATED APPLICATIONS

The present invention is a continuation of U.S. patent application Ser. No. 11/082,098, entitled SYSTEM AND METHOD FOR EFFICIENTLY CALCULATING STORAGE REQUIRED TO SPLIT A CLONE VOLUME, by Robert L. Fair, filed on Mar. 16, 2005, which is now issued as U.S. Pat. No. 7,757,056 on Jul. 13, 2010, and which application is related to the following U.S. Patents:

U.S. Pat. No. 7,409,511, issued on Aug. 5, 2008, entitled CLONING TECHNIQUE FOR EFFICIENTLY CREATING A COPY OF A VOLUME IN A STORAGE SYSTEM, by John K. Edwards et al.; and U.S. Pat. No. 7,334,094, issued on Feb. 19, 2008, entitled ONLINE CLONE VOLUME SPLITTING TECHNIQUE, by Robert L. Fair, the contents said patents are hereby incorporated by reference.

FIELD OF THE INVENTION

The present invention relates to storage systems and, more specifically to efficiently calculating the storage required to split a clone volume from a parent volume.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n–1 blocks.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage operating system may further implement a storage module, such as a RAID system, that manages the storage and retrieval of the information to and from the disks in accordance with input/output (I/O) operations. The RAID system is also responsible for parity operations in the storage system. Note that the file system only "sees" the data disks within its vbn space; the parity disks are "hidden" from the file system and, thus, are only visible to the RAID system. The RAID system typically organizes the RAID groups into one large "physical" disk (i.e., a physical volume), such that the disk blocks are concatenated across all disks of all RAID groups. The logical volume maintained by the file system is then "disposed over" (spread over) the physical volume maintained by the RAID system.

A file system layout may apportion an underlying physical volume into one or more virtual volumes (vvols) of a storage system. An example of such a file system layout is described in U.S. Pat. No. 7,409,494 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

File systems may incorporate a cloning technique that enables efficient and substantially instantaneous creation of a clone that is a writable copy of a "parent" virtual volume (vvol) in an aggregate of a storage system. An example of such a cloning technique is described in the above-incorporated U.S. Patent entitled CLONING TECHNIQUE FOR EFFICIENTLY CREATING A COPY OF A VOLUME IN A STORAGE SYSTEM. The clone is instantiated by, e.g., loading a file system associated with the new vvol onto the clone and bringing the clone "online", with the only blocks owned by the clone comprising its modified volinfo block. The file system executes on the clone as it would on a typical vvol, such as the parent vvol. In fact, the file system within the clone resembles the file system within a base snapshot, since they comprise substantially the same blocks on disk. The resulting clone is thus a "full-fledged" vvol, i.e., it can service storage (read and write) requests and has its own logical properties. As a result, the cloning technique enables the clone and parent vvol to share on-disk blocks of data in a zero-copy fashion, while also allowing for modifications.

As can be appreciated, the splitting of blocks shared between a clone and its parent may consume substantial disk storage space. Consequently an administrator must "manually" estimate the amount of storage space required to perform a clone splitting operation. In known implementations, the administrator may then initiate an online clone splitting operation and wait until the clone splitting operation substantially completes to determine whether it succeeded or failed due to a lack of disk space. This presents a noted disadvantage in that the time required to perform the clone splitting operation may be on the order of hours, thereby delaying results (i.e., success) of the operation for that length of time. An alternative, "brute force" technique for determining the amount of space required for a clone splitting operation is to determine, for each block in the clone, whether it is located in the clone's parent (or parent's parent, etc) or within the clone's container file. As a clone may be on the order of gigabytes or terabytes in size, the time required to make this determination is substantial.

SUMMARY OF THE INVENTION

The present invention overcomes the disadvantages of the prior art by providing a system and method for efficiently calculating an estimated amount of storage required to split a clone volume from its parent volume. The system and method is illustratively embodied as a command line interface (CLI) command, i.e., a clone split estimate command, executed by an estimation module of a storage system. Notably, the estimation module cooperates with a file system of the storage system to quickly access data structures containing information used to perform the storage calculation without the need to access each block of the clone and parent volumes.

In response to an administrator issuing the novel clone split estimate command, the estimation module interacts with the file system to retrieve the size (i.e., the number of blocks) of the clone volume. Illustratively, the clone volume size may be obtained by examining metadata of a file system information data structure associated with the volume. The estimation module then interacts with the file system to retrieve the number of blocks stored in a container file for the clone volume. Thereafter, the estimation module calculates the amount of storage required by subtracting the number of blocks in the container file from the number of blocks of the clone volume. The result of this calculation estimates the number of blocks stored in the parent volume of the clone (or parent's parent, etc.) that must be written during the clone split operation. This estimated number of blocks may be displayed to the administrator so that appropriate disk provisioning may occur before the initiation of a clone split operation.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System

Figure 1:
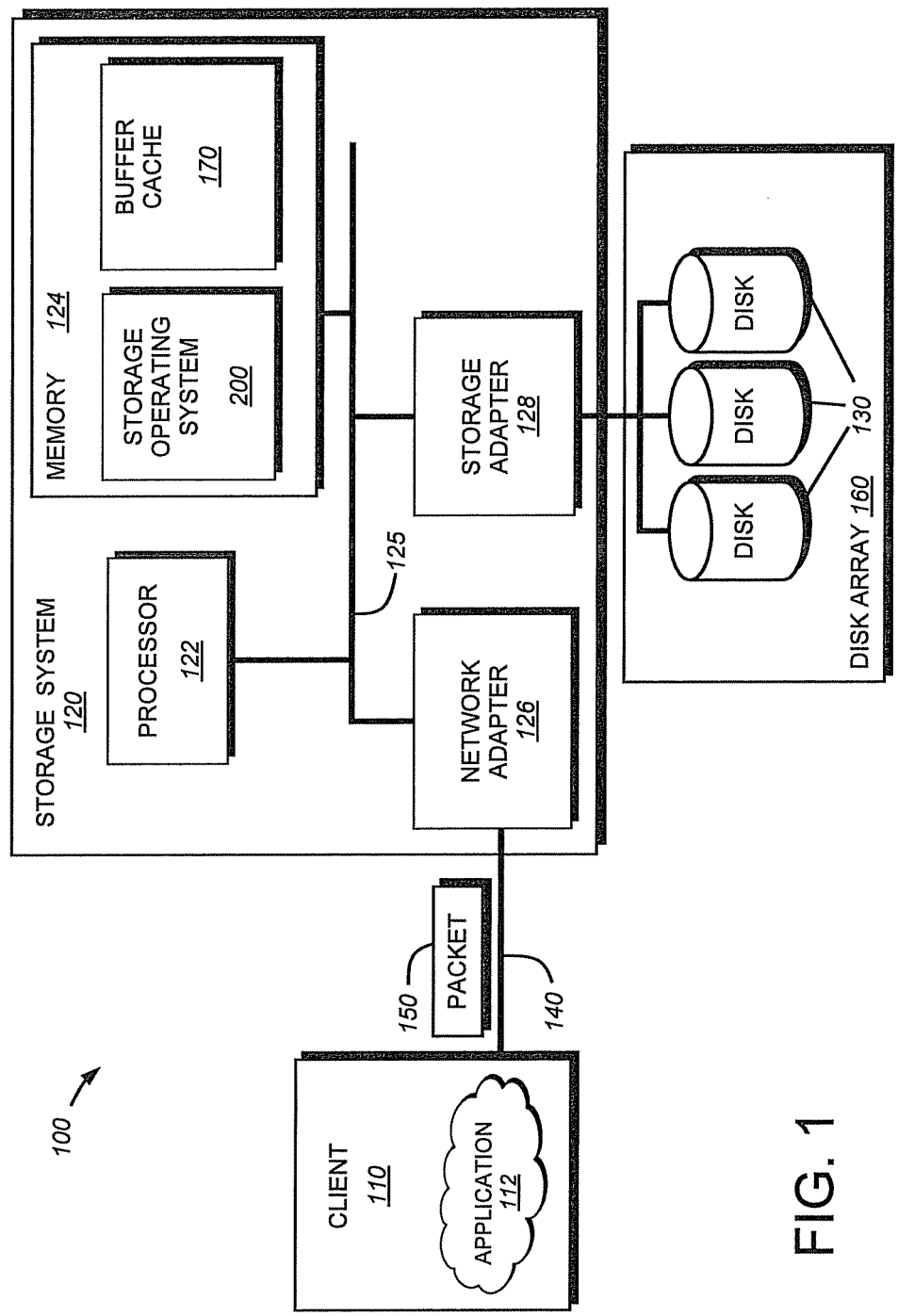
FIG. 1 is a schematic block diagram of an environment including a storage system that may be advantageously used with the present invention.

FIG. 1 is a schematic block diagram of an environment 100 including a storage system 120 that may be advantageously used with the present invention. The storage system is a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 140, which may comprise a point-to-point connection or a shared medium, such as a local area network. Illustratively, the computer network 140 may be embodied as an Ethernet network or a Fibre Channel (FC) network. The client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets 150 over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 2:
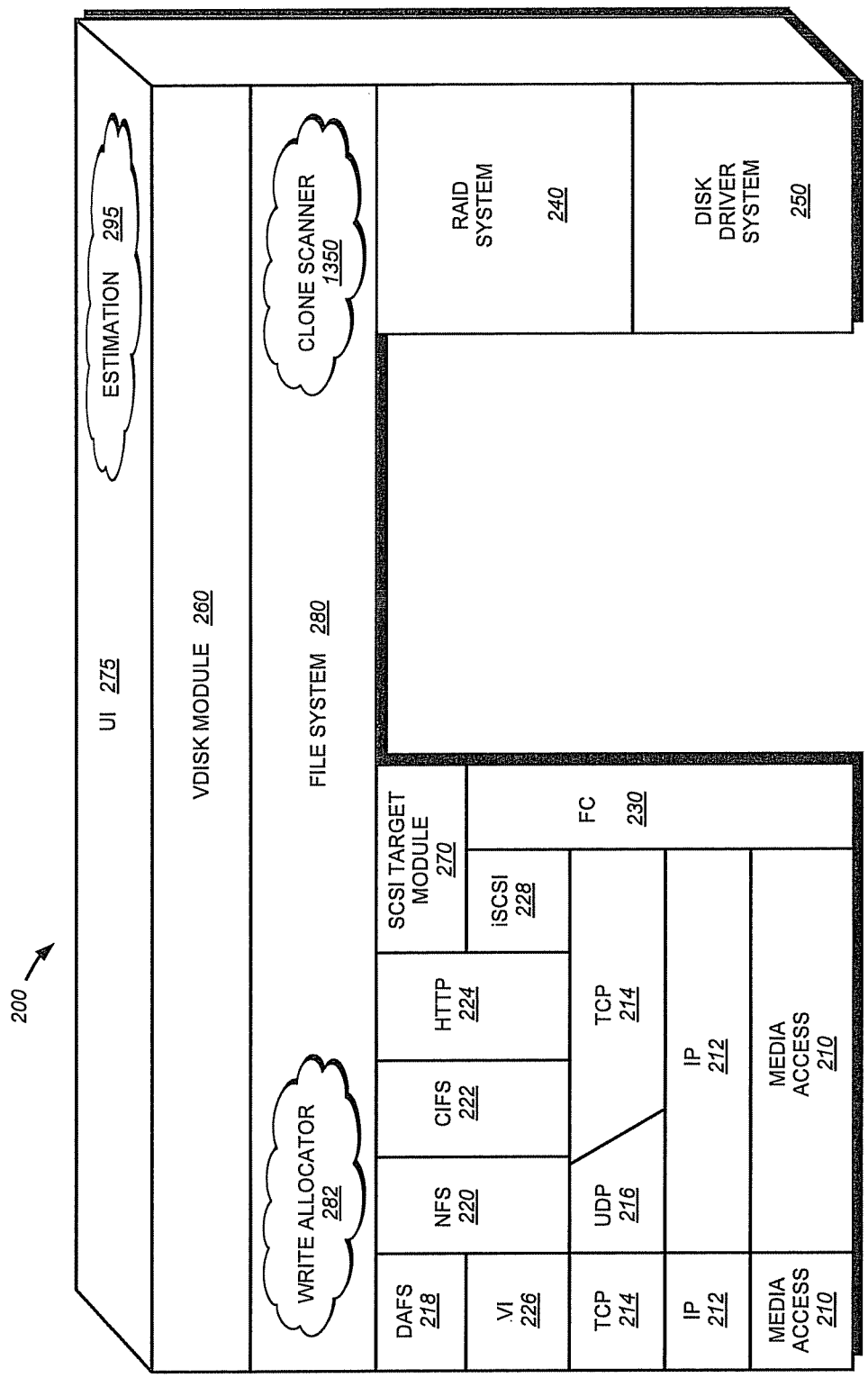
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 260 and SCSI target module 270. The vdisk module 260 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems. The UI includes a novel estimation module 295 that enables an administrator to efficiently estimate the amount of storage required to split a clone volume from its parent volume in accordance with an embodiment of the present invention. To that end, the estimate module 295 illustratively implements a novel clone split estimate command, described further below.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store metadata describing the layout of its file system; these metadata files include, among others, an mode file. A file handle, i.e., an identifier that includes an mode number, is used to retrieve an mode from disk.

Broadly stated, all modes of the write-anywhere file system are organized into the mode file. A file system (FS) info block specifies the layout of information in the file system and includes an mode of a file that includes all other modes of the file system. Each logical volume (file system) has an FS info block that is preferably stored at a fixed location within, e.g., a RAID group. The mode of the mode file may directly reference (point to) blocks of the mode file or may reference indirect blocks of the mode file that, in turn, reference direct blocks of the mode file. Within each direct block of the mode file are embedded modes, each of which may reference indirect blocks that, in turn, reference data blocks of a file.

Operationally, a request from the client 110 is forwarded as a packet 150 over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the mode file using the mode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled, MULTI-PROTOCOL STORAGE APPLIANCE THAT PROVIDES INTEGRATED SUPPORT FOR FILE AND BLOCK ACCESS PROTOCOLS, filed on Aug. 8, 2002 by Brian Pawlowski et al., which was published on Feb. 12, 2004 as Patent Publication No. 2004/0030668 A1. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Persistent Consistency Point Images (PCPIs)

The write-anywhere file system further supports multiple persistent consistency point images (PCPIs) that are generally created on a regular schedule. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights. Each PCPI refers to a copy of the file system that diverges from the active file system over time as the active file system is modified. In the case of the WAFL file system, the active file system diverges from the PCPIs since the PCPIs stay in place as the active file system is written to new disk locations. Each PCPI is a restorable version of the storage element (e.g., the active file system) created at a predetermined point in time and, as noted, is "read-only" accessible and "space-conservative". Space conservative denotes that common parts of the storage element in multiple PCPIs share the same file system blocks. Only the differences among these various PCPIs require extra storage blocks. The multiple PCPIs of a storage element are not independent copies, each consuming disk space; therefore, creation of a PCPI on the file system is instantaneous, since no entity data needs to be copied. Read-only accessibility denotes that a PCPI cannot be modified because it is closely coupled to a single writable image in the active file system. The closely coupled association between a file in the active file system and the same file in a PCPI obviates the use of multiple "same" files. In the example of a WAFL file system, PCPIs are described in TR3002 *File System Design for a NFS File Server Appliance* by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

Figure 3:
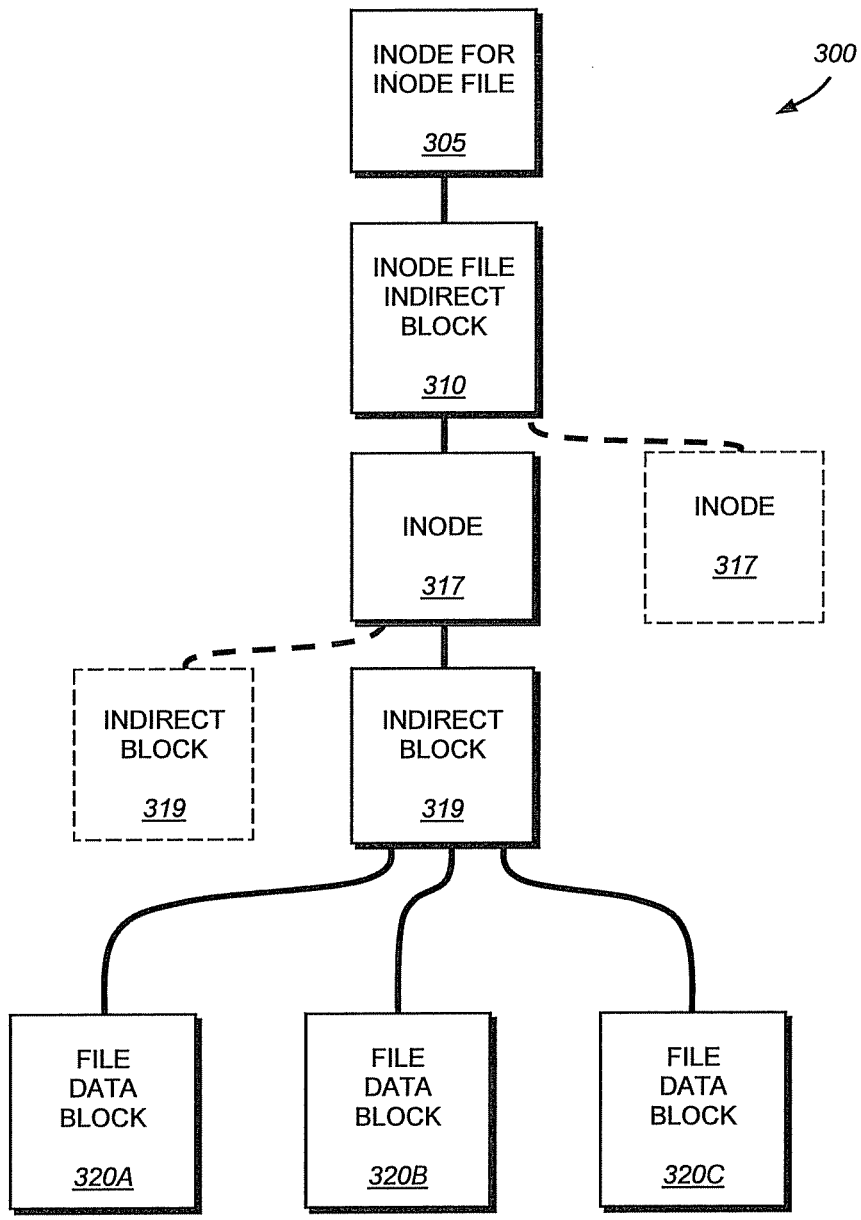
FIG. 3 is a schematic block diagram of an exemplary file system mode structure.

Broadly stated, a PCPI is stored on-disk along with the active file system, and is called into the memory of the storage system as requested by the storage operating system. The on-disk organization of the PCPI and the active file system can be understood from the following description of an exemplary file system mode structure 300 shown in FIG. 3. The mode for an mode file 305 contains information describing the mode file associated with a file system. In this exemplary file system mode structure, the mode for the mode file 305 contains a pointer that references (points to) an mode file indirect block 310. The mode file indirect block 310 contains a set of pointers that reference mode file blocks, each of which contains an array of modes 317, which in turn contain pointers to indirect blocks 319. The indirect blocks 319 include pointers to file data blocks 320A, 320B and 320C. Each of the file data blocks 320(A-C) is capable of storing, e.g., 4 kilobytes (kB) of data.

Figure 4:
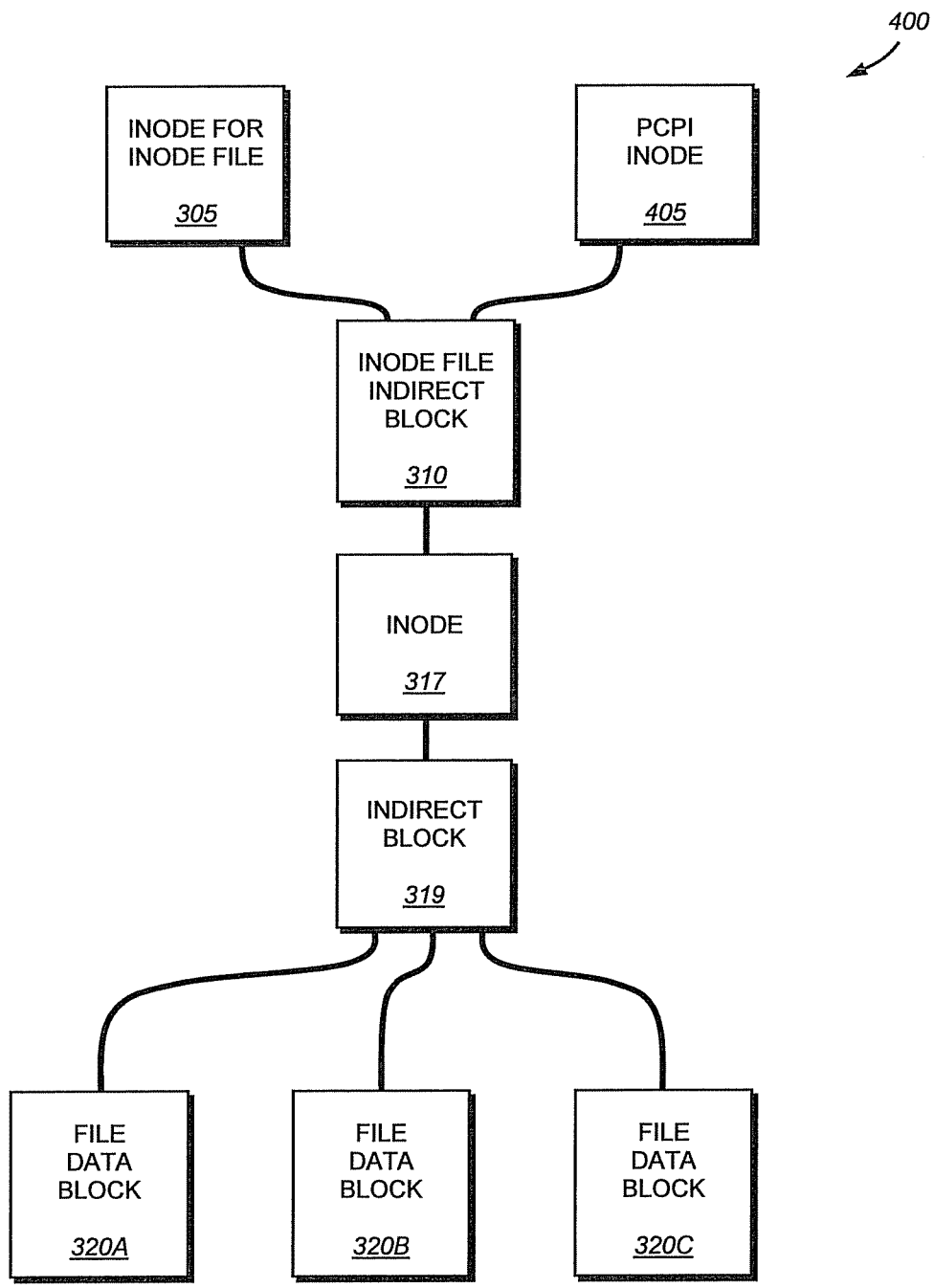
FIG. 4 is a schematic block diagram of the exemplary file system mode structure of FIG. 3 including a persistent consistency point image (PCPI) mode.
Figure 5:
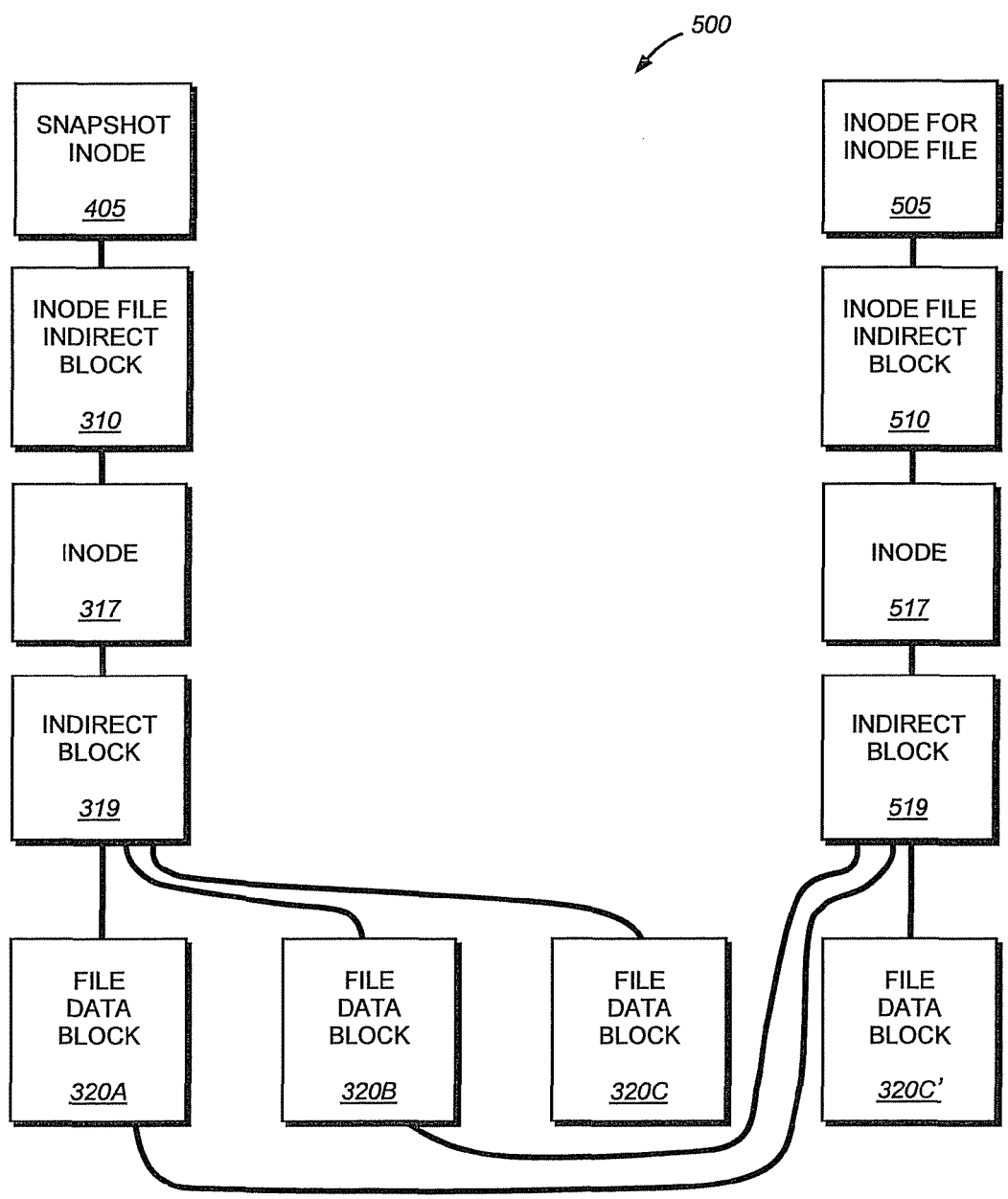
FIG. 5 is a schematic block diagram of an exemplary file system mode structure of FIG. 4 after a data block has been rewritten.

When the file system generates a PCPI of its active file system, a PCPI mode is generated as shown in FIG. 4. The PCPI mode 405 is, in essence, a duplicate copy of the mode for the mode file 305 of the file system mode structure 300 that shares common parts, such as modes and blocks, with the active file system. For example, the exemplary file system mode structure 400 includes the mode file indirect blocks 310, modes 317, indirect blocks 319 and file data blocks 320A-C as in FIG. 3. When a user modifies a file data block, the file system writes the new data block to disk and changes the active file system to point to the newly created block. FIG. 5 shows an exemplary file system mode structure 500 after a file data block has been modified. In this example, file data block 320C is modified to file data block 320C'. As a result, the contents of the modified file data block are written to a new location on disk as a function of the exemplary file system. Because of this new location, the indirect block 319 must be rewritten. Due to this changed indirect block 319, the mode 317 must be rewritten. Similarly, the mode file indirect block 310 and the mode for the mode file 305 must be rewritten.

Thus, after a file data block has been modified, the PCPI mode 405 contains a pointer to the original mode file indirect block 110 which, in turn, contains pointers through the mode 117 and indirect block 119 to the original file data blocks 120A, 120B and 120C. The newly written indirect block 319 also includes pointers to unmodified file data blocks 120A and 120B. That is, the unmodified data blocks in the file of the active file system are shared with corresponding data blocks in the snapshot file, with only those blocks that have been modified in the active file system being different than those of the snapshot file.

However, the indirect block 319 further contains a pointer to the modified file data block 120C' representing the new arrangement of the active file system. A new mode for the mode file 305 is established representing the new structure 300. Note that metadata (not shown) stored in any snapshotted blocks (e.g., 405, 110, and 120C) protects these blocks from being recycled or overwritten until they are released from all snapshots. Thus, while the active file system mode for the mode file 305 points to new blocks 310, 317, 319, 120A, 120B and 120C', the old blocks 405, 110 and 120C are retained until the snapshot is fully released.

PCPIs provide a versatile feature that is essential for data recovery operations, such as backup and recovery of storage elements. However, since PCPIs are read-only accessible and their contents cannot be modified, their use may be somewhat limited, particularly for operating systems and applications that do not have a notion of a read-only data store (a read-only file system) and that expect to write metadata at any time that the file system is accessible. When a storage element that is held in a PCPI is exported to a client and contains the data for such a problematic file system, an issue arises in that the client attempts to write data to the read-only image. This is a fundamental issue in the design of a reliable system for backups. In general, once a backup image is made (via a mechanism like a PCPI), that image should be inviolate. Modifying a PCPI ("backup") image could have serious consequences in that the data of the PCPI may no longer be a "point-in-time" copy and a consistent image of the storage element data may no longer be available for subsequent recovery operations.

This limitation may be overcome by creating a substantially instantaneous copy of a volume in accordance with a cloning technique as described in the above-incorporated U.S. Pat. No. 7,409,511 entitled CLONING TECHNIQUE FOR EFFICIENTLY CREATING A COPY OF A VOLUME IN A STORAGE SYSTEM. The cloning technique enables efficient creation of a clone volume ("clone") of a "parent" virtual volume (vvol) described further below, based on a common PCPI. The resulting clone is a "full-fledged" vvol, i.e., it can service storage (read and write) requests and has its own logical properties, such as snapshot operation functionality. Broadly stated, the clone initially shares disk storage with its parent vvol. As write operations are directed to the clone, the disk storage diverges with the clone acquiring its own storage on a block-by-block manner. However, the clone remains tied to the parent vvol through the common base PCPI. The base PCPI is "locked" in the parent to prevent the common blocks from being changed by write operations to the parent vvol. As data is written to the clone, new blocks are allocated in a container file of the clone.

D. File System Data Structures

Figure 6:
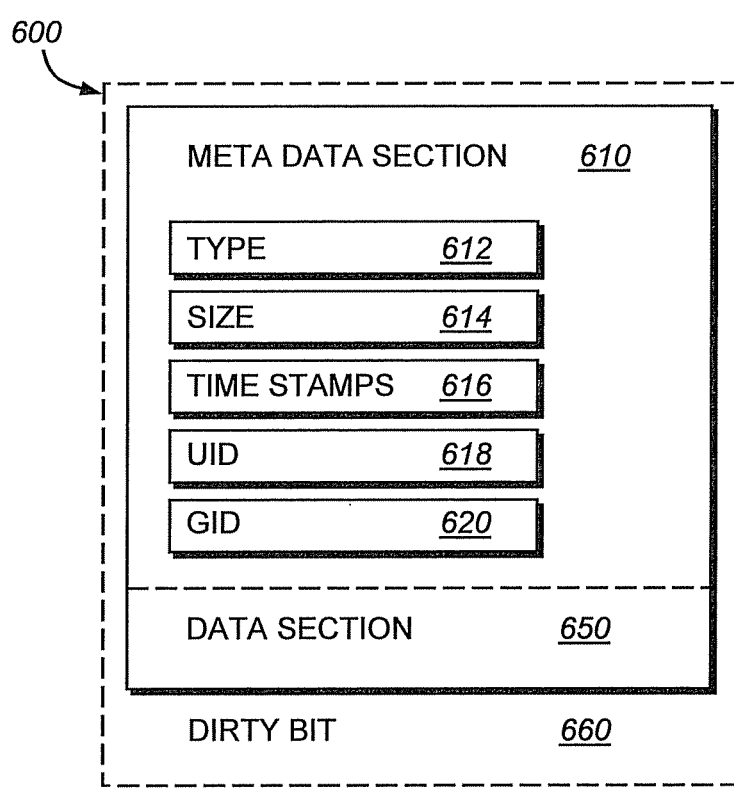
FIG. 6 is a schematic block diagram of an mode that may be advantageously used with the present invention.

In the illustrative embodiment, a file is represented in the write-anywhere file system as an mode data structure adapted for storage on the disks 130. FIG. 6 is a schematic block diagram of an mode 600, which preferably includes a metadata section 610 and a data section 650. The information stored in the metadata section 610 of each mode 600 describes the file and, as such, includes the type (e.g., regular, directory, virtual disk) 612 of file, the size 614 of the file, time stamps (e.g., access and/or modification) 616 for the file and ownership, i.e., user identifier (UID 618) and group ID (GID 620), of the file. The contents of the data section 650 of each mode, however, may be interpreted differently depending upon the type of file (mode) defined within the type field 612. For example, the data section 650 of a directory mode contains metadata controlled by the file system, whereas the data section of a regular mode contains file system data. In this latter case, the data section 650 includes a representation of the data associated with the file.

Specifically, the data section 650 of a regular on-disk mode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the mode, file system data having a size that is less than or equal to 64 bytes is represented, in its entirety, within the data section of that mode. However, if the file system data is greater than 64 bytes but less than or equal to 64 kB, then the data section of the mode (e.g., a first level mode) comprises up to 16 pointers, each of which references a 4 kB block of data on the disk.

Moreover, if the size of the data is greater than 64 kB but less than or equal to 64 megabytes (MB), then each pointer in the data section 650 of the mode (e.g., a second level mode) references an indirect block (e.g., a first level block) that contains 1024 pointers, each of which references a 4 kB data block on disk. For file system data having a size greater than 64 MB, each pointer in the data section 650 of the mode (e.g., a third level mode) references a double-indirect block (e.g., a second level block) that contains 1024 pointers, each referencing an indirect (e.g., a first level) block. The indirect block, in turn, that contains 1024 pointers, each of which references a 4 kB data block on disk. When accessing a file, each block of the file may be loaded from disk 130 into the buffer cache 170.

When an on-disk mode (or block) is loaded from disk 130 into buffer cache 170, its corresponding in core structure embeds the on-disk structure. For example, the dotted line surrounding the mode 600 indicates the in-core representation of the on-disk mode structure. The in-core structure is a block of memory that stores the on-disk structure plus additional information needed to manage data in the memory (but not on disk). The additional information may include, e.g., a "dirty" bit 660. After data in the mode (or block) is updated/modified as instructed by, e.g., a write operation, the modified data is marked "dirty" using the dirty bit 660 so that the mode (block) can be subsequently "flushed" (stored) to disk. The in-core and on-disk format structures of the WAFL file system, including the modes and mode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued on Oct. 6, 1998.

Figure 7:
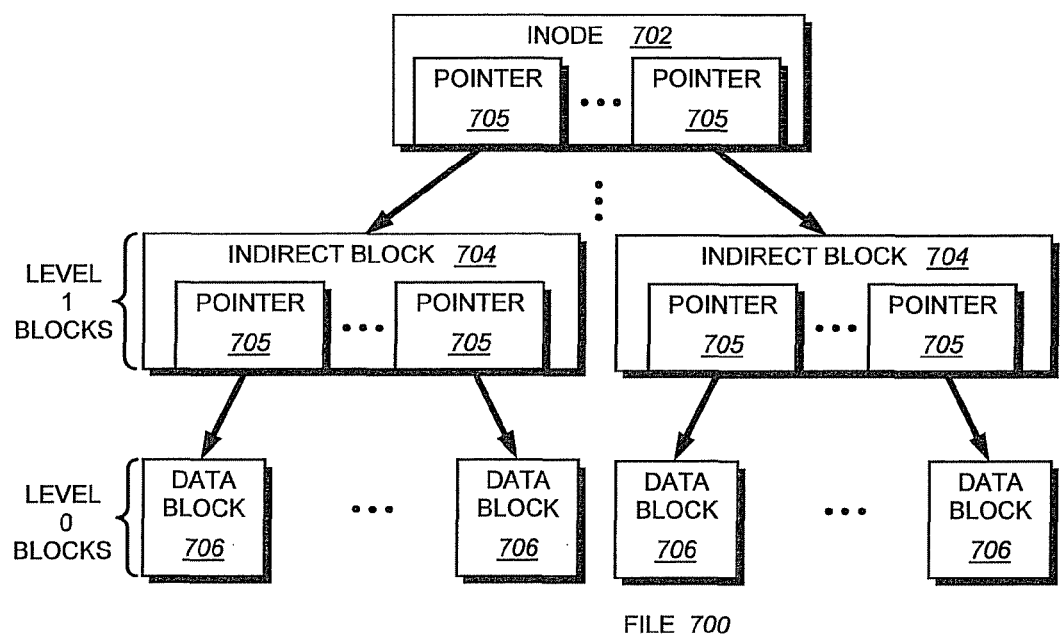
FIG. 7 is a schematic block diagram of a buffer tree of a file that may be advantageously used with the present invention.

FIG. 7 is a schematic block diagram of a buffer tree of a file that may be advantageously used with the present invention. The buffer tree is an internal representation of blocks for a file (e.g., file 700) loaded into the buffer cache 170 and maintained by the write-anywhere file system 280. A root (top-level) mode 702, such as an embedded mode, references indirect (e.g., level 1) blocks 704. The indirect blocks (and mode) contain pointers 705 that ultimately reference data blocks 706 used to store the actual data of file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

The present invention employs a cloning technique that, as noted, enables efficient and substantially instantaneous creation of a clone that is a copy of a parent vvol in an aggregate of a storage system. The aggregate is a physical volume comprising one or more groups of disks, such as RAID groups, underlying one or more vvols of the storage system. The aggregate has its own physical volume block number (pvbn) space and maintains metadata, such as block allocation bitmap structures, within that pvbn space. The parent vvol may be a typical vvol that, like any vvol, has its own virtual volume block number (vvbn) space and maintains metadata, such as block allocation bitmap structures, within that vvbn space.

Illustratively, pvbns are used as block pointers within buffer trees of files (such as file 700) stored in a vvol. This illustrative "hybrid" vvol embodiment involves the insertion of only the pvbn in the parent indirect block (e.g., mode or indirect block). Use of pvbns avoids latency associated with translations from vvbns-to-pvbns, e.g., when servicing file system (such as NFS, CIFS) requests. On a read path of a logical volume, a "logical" volume (vol) info block has one or more pointers that reference one or more fsinfo blocks, each of which, in turn, "points to" an Mode file and its corresponding Mode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk, dbn occurs at the file system/RAID system boundary of the storage operating system 200.

In an alternate "dual vbn hybrid" vvol embodiment, both the pvbn and vvbn are inserted in the parent indirect (e.g., level 1) blocks in the buffer tree of a file, such as file 700.

Here, the use of pvbns as block pointers in the indirect blocks provides efficiencies in the read paths, while the use of vvbn block pointers provide efficient access to required metadata. That is, when freeing a block of a file, the parent indirect block in the file contains readily available vvbn block pointers, which avoids the latency associated with accessing an owner map (described herein) to perform pvbn-to-vvbn translations; yet, on the read path, the pvbn is available. A disadvantage of this dual vbn variant is the increased size of indirection data (metadata) stored in each file.

E. Aggregate

Figure 8:
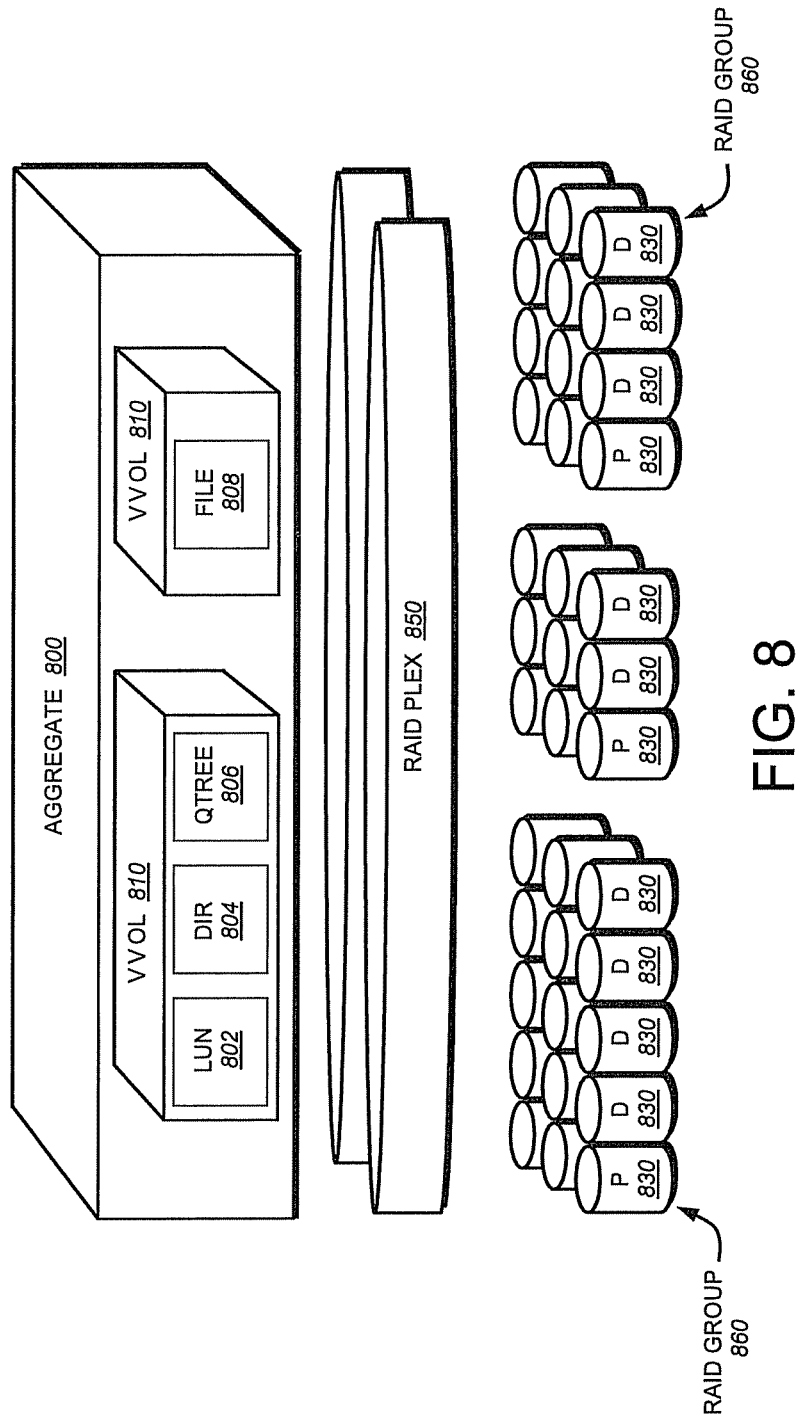
FIG. 8 is a schematic block diagram of an embodiment of an aggregate that may be advantageously used with the present invention.

FIG. 8 is a schematic block diagram of an embodiment of an aggregate 800 that may be advantageously used with the present invention. Luns (blocks) 802, directories 804, qtrees 806 and files 808 may be contained within vvols 810 that, in turn, are contained within the aggregate 800. The aggregate 800 is illustratively layered on top of the RAID system, which is represented by at least one RAID plex 850 (depending upon whether the storage configuration is mirrored), wherein each plex 850 comprises at least one RAID group 860. Each RAID group further comprises a plurality of disks 830, e.g., one or more data (D) disks and at least one (P) parity disk.

Whereas the aggregate 800 is analogous to a physical volume of a conventional storage system, a vvol is analogous to a file within that physical volume. That is, the aggregate 800 may include one or more files, wherein each file contains a vvol 810 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 810 is also a logical volume, it has its own block allocation structures (e.g., active, space and summary maps) in its vvbn space.

Figure 9:
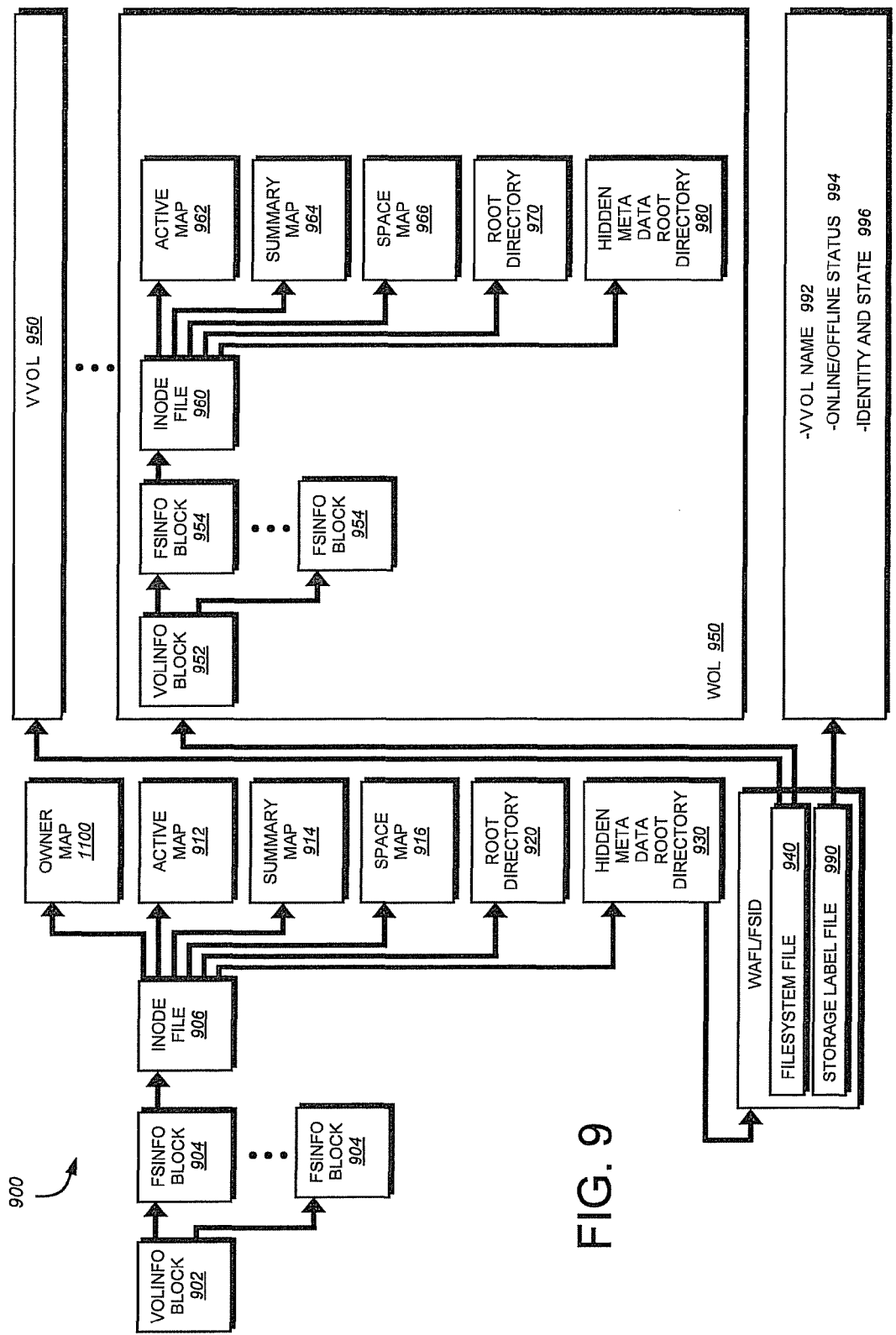
FIG. 9 is a schematic block diagram of an on-disk representation of an aggregate.

FIG. 9 is a schematic block diagram of an on-disk representation of an aggregate 900. The storage operating system 200, e.g., the RAID system 240, assembles a physical volume of pvbns to create the aggregate 900, with pvbns 1 and 2 comprising a "physical" volinfo block 902 for the aggregate. Broadly stated, a volinfo block stores volume-level information, as well as provides support for large numbers of snapshots. To that end, the volinfo block 902 contains block pointers to fsinfo blocks 904, each of which may represent a snapshot of the aggregate. Each fsinfo block 904 includes a block pointer to an mode file 906 that contains modes of a plurality of files, including an owner map 1100, an active map 912, a summary map 914 and a space map 916, as well as other special metadata files. The mode file 906 further includes a root directory 920 and a "hidden" metadata root directory 930, the latter of which includes a namespace having files related to a vvol in which users cannot "see" the files. The hidden metadata root directory also includes a WAFL/fsid/directory structure, as described herein, which contains a filesystem file 940 and storage label file 990. Note that root directory 920 in the aggregate is empty; all files related to the aggregate are organized within the hidden metadata root directory 930.

The filesystem file 940 includes block pointers that reference various file systems embodied as vvols 950. The aggregate 900 maintains these vvols 950 at special reserved mode numbers. Each vvol 950 also has special reserved mode numbers within its vvol space that are used for, among other things, the block allocation bitmap structures. As noted, the block allocation bitmap structures, e.g., active map 962, summary map 964 and space map 966, are located in each vvol.

Specifically, each vvol 950 has the same mode file structure/content as the aggregate, with the exception that there is no owner map and no WAFL/fsid/filesystem file, storage label file directory structure in a hidden metadata root directory 980. To that end, each vvol 950 has a volinfo block 952 that points to one or more fsinfo blocks 954, each of which may represent a PCPI of the vvol. Each fsinfo block 954 includes metadata relating to the vvol, including the size of the vvol. Each fsinfo block, in turn, points to an mode file 960 that, as noted, has the same mode structure/content as the aggregate with the exceptions noted above. Each vvol 950 has its own mode file 960 and distinct mode space with corresponding mode numbers, as well as its own root (fsid) directory 970 and subdirectories of files that can be exported separately from other vvols.

The storage label file 990 contained within the hidden metadata root directory 930 of the aggregate is a small file that functions as an analog to a conventional raid label. A raid label includes "physical" information about the storage system, such as the volume name; that information is loaded into the storage label file 990. Illustratively, the storage label file 990 includes the name 992 of the associated vvol 950, the online/offline status 994 of the vvol, and other identity and state information 996 of the associated vvol (whether it is in the process of being created or destroyed).

A container file is a file in the aggregate that contains all blocks used by a vvol. The container file is an internal (to the aggregate) feature that supports a vvol; illustratively, there is one container file per vvol. The container file is a hidden file (not accessible to a user) in the aggregate that holds every block in use by the vvol. As noted, the aggregate includes an illustrative hidden metadata root directory that contains subdirectories of vvols:

WAFL/Fsid/Filesystem File, Storage Label File

Figure 10:
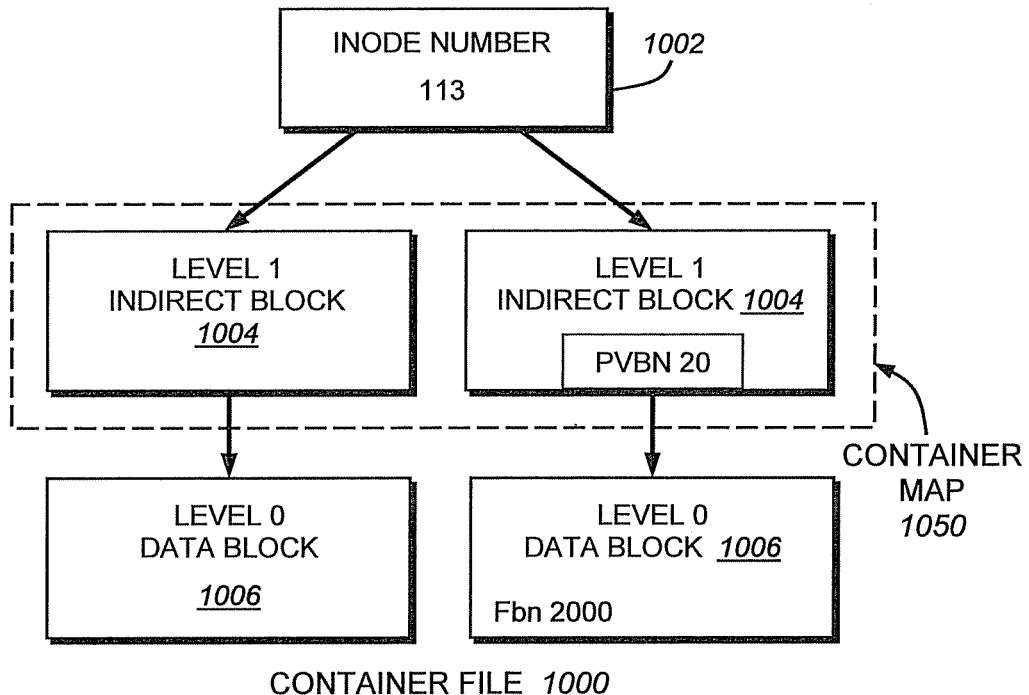
FIG. 10 is a schematic block diagram of a container file that may be advantageously used with the present invention.

Specifically, a "physical" file system (WAFL) directory includes a subdirectory for each vvol in the aggregate, with the name of subdirectory being a file system identifier (fsid) of the vvol. Each fsid subdirectory (vvol) has at least two files, the filesystem file 940 and the storage label file 990. The filesystem file is a large sparse file that contains all blocks owned by a vvol and, as such, is referred to as the container file for the vvol. FIG. 10 is a schematic block diagram of a container file 1000 (buffer tree) that is assigned a new type and has an mode 1002 that is assigned an mode number equal to a virtual volume id (vvid) of the vvol, e.g., container file 1000 has an mode number 113. The container file is essentially one large virtual disk and, since it contains all blocks owned by its vvol, a block with vvbn X in the vvol can be found at fbn X in the container file. For example, vvbn 2000 in a vvol can be found at fbn 2000 in its container file 1000. Since each vvol has its own distinct vvbn space, another container file may have fbn 2000 that is different from fbn 2000 in the illustrative container file 1000.

Assume that a level 0 block 1006 of the container file 1000 has an fbn 2000 and an indirect (level 1) block 1004 of the level 0 block 1006 has a block pointer referencing the level 0 block, wherein the block pointer has a pvbn 20. Thus, location fbn 2000 of the container file 1000 is pvbn 20 (on disk). Notably, the block numbers are maintained at the first indirect level (level 1) of the container file 1000; e.g., to locate block 2000 in the container file, the file system layer accesses the 2000th entry at level 1 of the container file and that indirect block provides the pvbn 20 for fbn 2000.

In other words, level 1 indirect blocks of the container file contain the pvbns for blocks in the file and, thus, "map" vvbns-to-pvbns of the aggregate. Accordingly, the level 1 indirect blocks of the container file 1000 are configured as a "container map" 1050 for the vvol; there is preferably one container map 1050 per vvol. The container map provides block pointers from fbn locations within the container file to pvbn locations on disk. Furthermore, there is a one-to-one correspondence between fbn locations in the container file and vvbn locations in a vvol.

Figure 11:
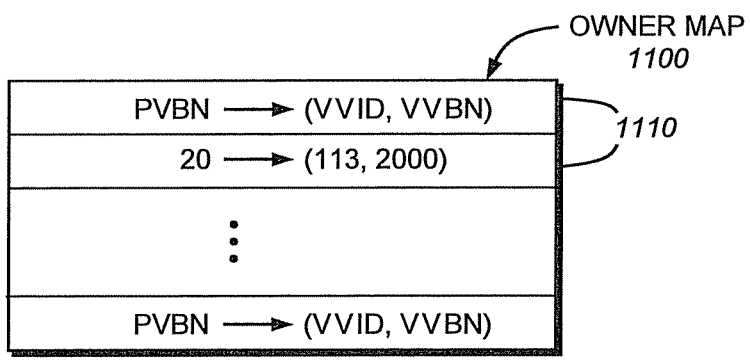
FIG. 11 is a schematic block diagram of an owner map that may be advantageously used with the present invention.

While the container map 1050 provides a "forward" mapping of vvbn-to-pvbn, an owner map provides a "backward" mapping between pvbn-to-vvbn (and vvid). In particular, mapping metadata of the owner map provides a backward mapping between each pvbn in the aggregate to (i) a vvid that "owns" the pvbn and (ii) the vvbn of the vvol in which the pvbn is located. FIG. 11 is a schematic block diagram of an owner map 1100 that may be advantageously used with the present invention. The owner map 1100 may be embodied as a data structure having a plurality of entries 1110; there is preferably one entry 1110 for each block in the aggregate.

In the illustrative embodiment, each entry 1110 has a 4-byte vvid and a 4-byte vvbn, and is indexed by a pvbn. That is, for a given block in the aggregate, the owner entry 1110 indicates which vvol owns the block and which pvbn it maps to in the vvbn space, e.g., owner entry 1110 indexed at pvbn 20 has contents vvid 113 and vvbn 2000. Thus when indexing into the owner map 1100 at pvbn 20, the file system 580 accesses a vvol having an mode 113 (which is container file 1000) and then accesses block location 2000 within that file. Each entry 1110 of the owner map 1100 is only valid for blocks that are in use and a vvol only owns those blocks used in the contained file system.

Figure 12:
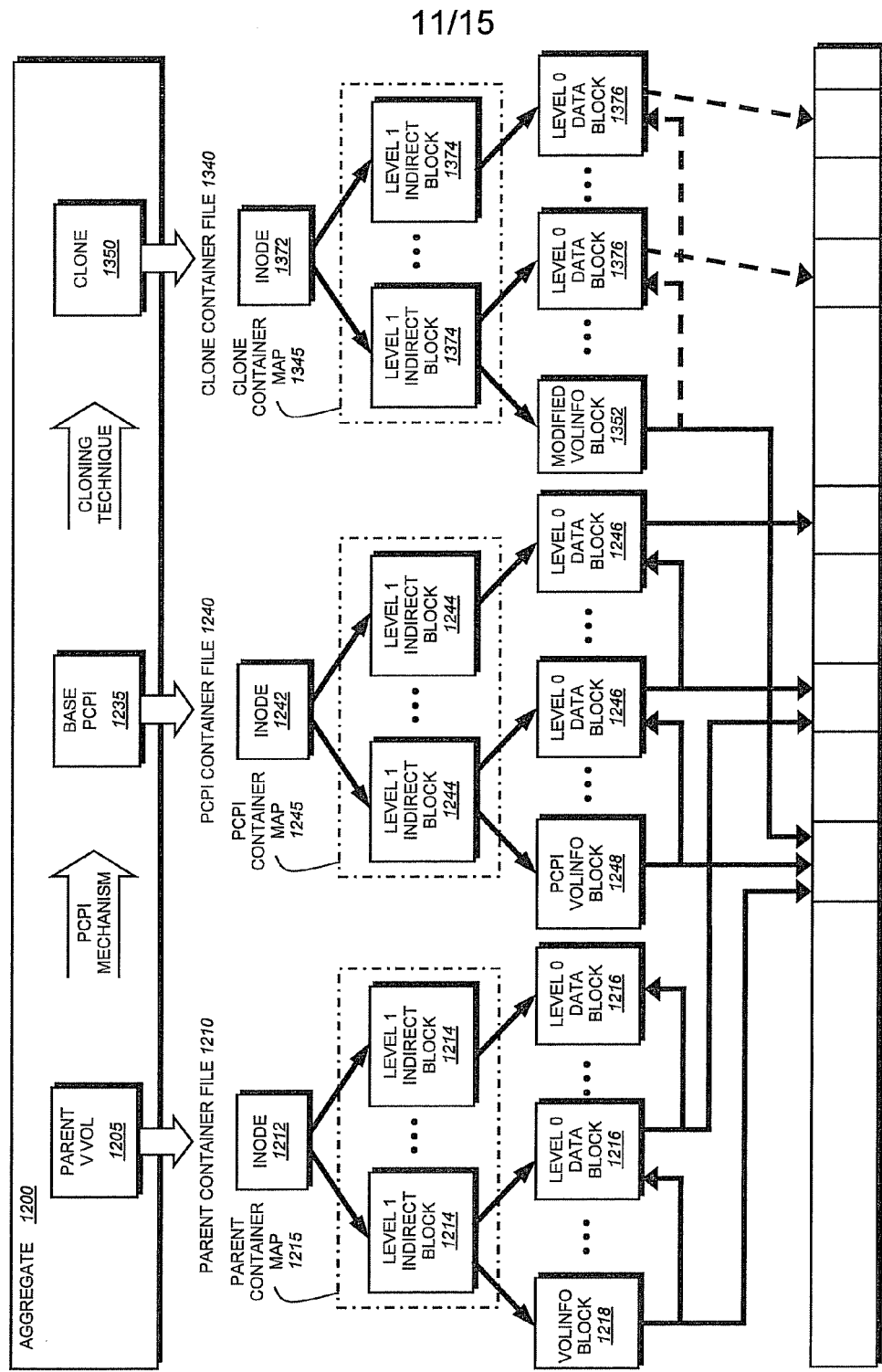
FIG. 12 is a schematic block diagram illustrating an embodiment of an aggregate that may be advantageously used with the present invention.

FIG. 12 is a schematic block diagram illustrating an embodiment of an aggregate 1200 that may be advantageously used with the present invention. The aggregate 1200 contains at least one vvol, hereinafter parent vvol 1205. The parent vvol 1205 comprises a parent container file 1210 (similar to container file 1000) that is represented as a parent buffer tree having a plurality of blocks in the aggregate, including mode 1212, level 1 indirect blocks 1214, which are organized as parent container map 1215 (similar to container map 1050), and level 0 data blocks 1216, which comprise all of the blocks used by the parent vvol 1205, including a volinfo block 1218. Each block includes one or more pointers that reference (point to) physical blocks located on disk 1220. In the illustrative hybrid vvol embodiment, the pointers within the vvol are aggregate block numbers, such as pvbns.

As noted, a vvol (such as parent vvol 1205) generally has the same mode file structure/content as the aggregate, including its own mode file and distinct mode space with corresponding mode numbers, as well as its own root (fsid) directory and subdirectories of files (modes). To that end, the parent vvol 1205 has a volinfo block 1218 that points to one or more fsinfo blocks that, in turn, points to an mode of an mode file that has the same mode structure/content as the aggregate with the exceptions previously noted. The mode for the mode file contains information describing the mode file associated with a file system, such as file system 280, executing on the parent vvol 1205. The mode for the mode file may contain a pointer that references (points to) an mode file indirect block containing a set of pointers that reference modes within its root directory. Each mode contains pointers to indirect blocks, such as level 1 indirect blocks and each indirect block includes pointers to level 0 data blocks.

A snapshot can be created from the parent vvol 1205 in accordance with a conventional snapshot mechanism. When the file system 280 generates a parent vvol snapshot (hereinafter "base snapshot" 1235) of its active file system, an image of the active file system at a point in time (i.e., a consistently point, CP) is "frozen". Note that the base snapshot 1235 is contained within and uses blocks in the parent container file 1210. As a result, there is no container file for the base snapshot 1235 as the snapshot reuses shared blocks in the vvbn space (and pvbn space) with the parent's active file system. However, for purposes of depiction and ease of description, a "snapshot container file 1240" is shown and described with respect to FIG. 12. Yet is should be noted that blocks in the parent container file 1210 are "held down" by the base snapshot 1235 and the clone (described herein) shares the same pvbns. Moreover, the clone uses blocks in the vvbn space for which it has no pointers in its container; this is what keeps the clone from freeing the parent's blocks.

As illustratively shown, the base snapshot 1235 comprises a snapshot container file 1240 (similar to parent container file 1210) that is represented as a snapshot buffer tree having a plurality of blocks in the aggregate, including mode 1242, level 1 indirect blocks 1244, which are organized as snapshot container map 1245 (similar to parent container map 1215), and level 0 data blocks 1246, which comprise all of the blocks used by the base snapshot 1235, including a snapshot volinfo block 1248. The snapshot volinfo block 1248 is a duplicate copy of the volinfo block 1218 of the parent vvol 1205. Accordingly, the base snapshot 1235 shares data structures, such as fsinfo blocks, as well as modes, indirect blocks and data blocks of an mode buffer tree, with the active file system on parent vvol 1205. An instance of the parent vvol "file" in the active file system thus cannot be deleted if the instance of the same file in the snapshot is to be preserved.

In particular, the snapshot mechanism ensures that all blocks of the mode buffer tree remain fixed and all pointers within that buffer tree reference (point to) those fixed blocks. To that end, the physical blocks (pvbns) in the aggregate that are used by the base snapshot 1235 remain fixed and cannot be changed as long as the snapshot persists. In general, when a snapshot is created, all blocks that existed at the CP are prevented from being deleted and/or overwritten in accordance with a snapshot pinning mechanism and any new changes to the blocks in the buffer tree are written elsewhere (to other free blocks). In the case of the base snapshot 1235, those changes are written to blocks in a vvbn space and in a pvbn space of the aggregate. Although the snapshotted blocks remain intact, any additional changes to the active file system are written in free blocks of the vvbn and pvbn spaces.

With respect to the PCPI pinning mechanism, each PCPI has an associated in-memory "pin counter" variable. Each volume has an in-memory data structure that includes an array containing information about the current snapshots for that volume (one array element per snapshot). Part of each array is the pin counter having a value that is dynamically adjusted and initialized at system boot. Pinning increases the counter by 1 and unpinning decreases the counter by 1. When the value of the pin counter is non-zero, the associated PCPI is regarded as "pinned" (locked) and cannot be deleted.

F. Clone of a Volume

The cloning technique is employed to create a new vvol (e.g., filesystem file), along with a new fsid subdirectory in the aggregate and a new storage label file. The new vvol is embodied as a clone 1350 and comprises an appropriately sized clone container file 1340 represented as a clone buffer tree having a plurality of blocks in the aggregate, including mode 1372, level 1 indirect blocks 1374, which are organized as a clone container map 1345 and level 0 data blocks 1376, which comprise all of the blocks used by the clone. Initially the clone container file 1340 has no (zero) data, i.e., it is entirely sparse, and the container map 1345 is empty. Moreover, a volinfo block for the clone is created that is a slightly modified version of the volinfo block 1248 from the base PCPI 1235. The modified volinfo block 1352 is written to (store at a level 0 data block of) the container file 1340 of the new vvol clone, i.e., the clone is inserted at the volinfo block location of the new vvol.

It should be noted that the clone container file 1340 only holds all blocks allocated to the clone 1350. The point of a clone is that is uses blocks "owned" by its parent vvol. The clone container file 1340 has "holes" at the locations of any blocks inherited from the parent vvol. As an example, assume that an indirect block pointer in a file in the parent vvol 1205 contains pvbn 100 and vvbn 200. Thus, block 200 in the parent container file 1210 is pvbn 100. In clone 1350, the indirect block pointers are also pvbn 100 and vvbn 200, but entry 200 in the clone container file 1340 is zero ("0"), indicating a hole and that the clone inherited its vvbn 200 from the parent vvol. Since entry 200 is 0, the clone "knows" that it could not free the block 100.

Figure 13:
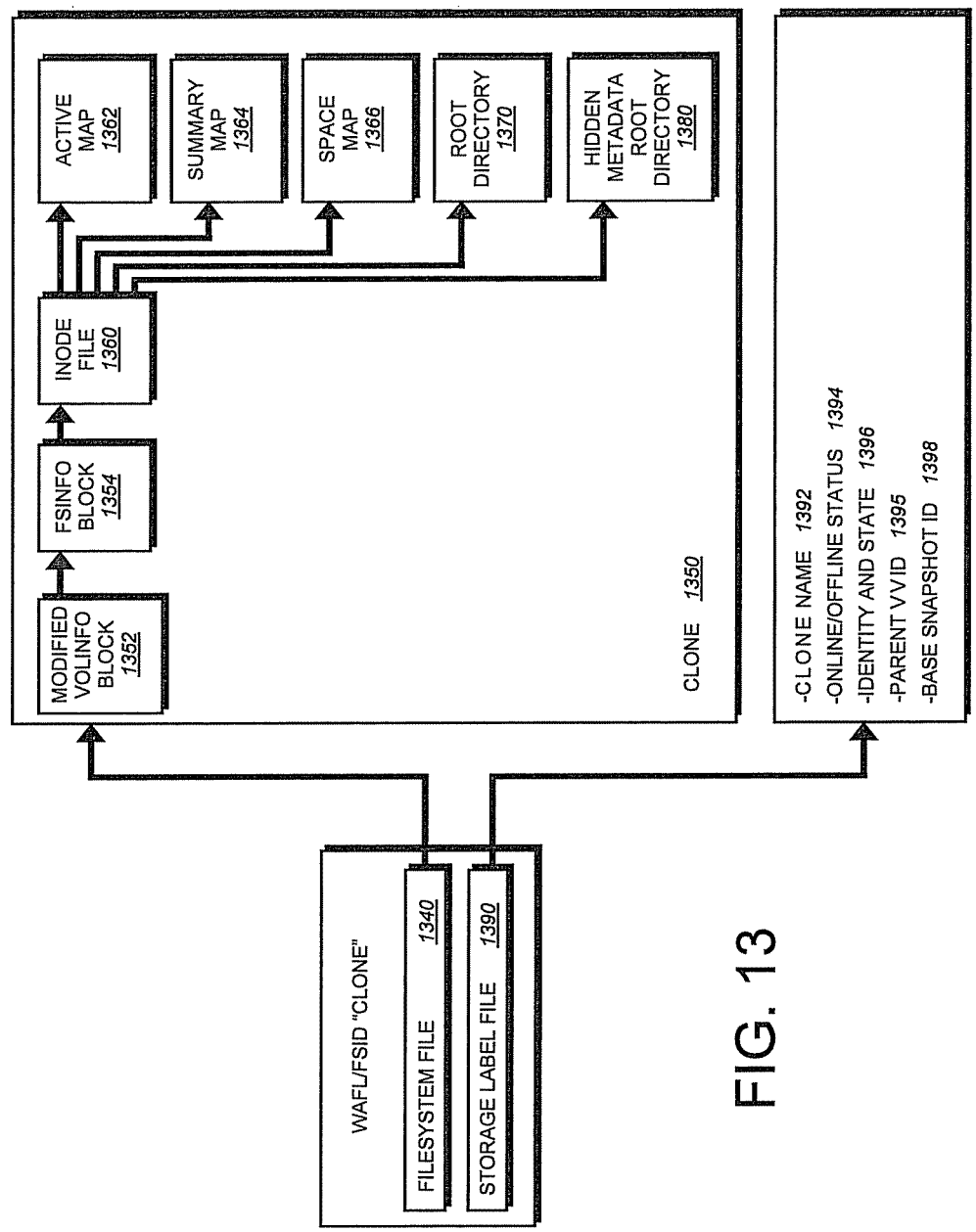
FIG. 13 is a schematic block diagram of an on-disk representation of a clone that may be advantageously used with the present invention.

FIG. 13 is a schematic block diagram of an on-disk representation of clone 1350. The hidden metadata root directory 930 (FIG. 9) in the aggregate 900 is modified to include a new fsid "clone" subdirectory having at least two new files, filesystem file 1340 and storage label file 1390: WAFL/fsid "clone"/filesystem file, storage label file. As noted, the storage label file is a small file that functions as an analog to a conventional raid label and, to that end, the new storage label file 1390 includes the name 1392 of the clone 1350, the online/offline status 1394 of the clone, and other identity and state information 1396 of the associated clone 1350.

Similarly, the new filesystem file 1340 is a large sparse file that contains all blocks owned by a vvol (clone) and, as such, is also referred to as the container file for the clone. The new filesystem file 1340 includes a block pointer that references a file system embodied as clone 1350. As a vvol, the clone 1350 has a vvol space with special reserved mode numbers that are used for, among other things, the block allocation bitmap structures. As further described herein, the block allocation bitmap structures, e.g., active map 1362, summary map 1364 and space map 1366, are inherited from the base snapshot 1235 (and thus the parent vvol 1205).

Specifically, the clone 1350 includes a volinfo block 1352 that points to a fsinfo block that, in turn, points to an mode of mode file that has the same mode structure/content as the aggregate with the exceptions previously noted. The mode for the mode file contains information describing the mode file 1360 associated with the file system, such as file system 280, executing on the clone 1350. The mode for the mode file may contain a pointer that references (points to) an mode file indirect block containing a set of pointers that reference modes within root directory 1370 of the clone 1350. Each mode contains pointers to indirect blocks, such as level 1 indirect blocks and each indirect block includes pointers to level 0 data blocks.

Referring also to FIG. 12, the PCPI volinfo block 1248 from the base PCPI 1235 is inserted as a level 0 data block (volinfo block 1352) within the container file 1340 on the clone. The volinfo block 1352 is a slightly modified version of the PCPI volinfo block 1248; for example, the volinfo block 1352 is modified to delete all PCPIs (fsinfo blocks) other than fsinfo block 1354 for the base PCPI 1235. The inherited summary map 1364 is also modified to reflect that all non-cloned snapshots have been removed (deleted) from the clone. The modified volinfo block 1352 is thus substantially similar to PCPI volinfo block 1248 and, to that end, essentially incorporates the base PCPI into the clone; accordingly the base PCPI (and its associated safeguards) protects the snapshotted blocks from being overwritten. All new changes are written to block locations in the vvbn and pvbn spaces of the base PCPI that are not used and, thus, cannot interfere with the clone.

Since the modified volinfo block 1352 forms the root of a modified volinfo buffer tree that is similar to a parent volinfo block buffer tree of its parent vvol 1205, all blocks of the parent volinfo block buffer tree can be accessed when traversing the modified volinfo block buffer tree. In other words, the PCPI volinfo block 1248 stored in a level 0 block of the PCPI container file 1240 (actually the parent's container file 1210) contains pointers that reference other blocks of its buffer tree stored in other level 0 blocks 1246 (1216) of the container file 1240 (1210). The pointers within the volinfo block 1248 to the other level 0 blocks 1246 are physical pointers (pvbns) that reference physical block locations on disk 1220. Those parent (PCPI) volinfo buffer tree blocks can be accessed through the modified volinfo block 1352 of the clone 1350 in the same manner as traversing the PCPI container file tree 1240 because the blocks within the modified volinfo block buffer tree are the physical blocks represented by the level 0 data blocks 1246 in the PCPI container file 1240.

The clone 1350 may then be instantiated by, e.g., loading a file system associated with the new vvol onto the clone and bringing the clone "online", with the only blocks owned by the clone comprising its modified volinfo block. The file system, such as file system 280, executes on the clone as it would on a typical vvol, such as the parent vvol. In fact, the file system within the clone resembles the file system within the base PCPI, since they comprise substantially the same blocks on disk. The resulting clone 1350 is thus a "full-fledged" vvol, i.e., it can service storage (read and write) requests and has its own logical properties, such as snapshot operation functionality, that enables the clone to be snapshotted, snap restored, snapmirrored and otherwise manipulated as any other vvol. A restriction is that the base PCPI 1235 cannot be deleted in the parent vvol 1205 while the clone exists. As a result, the cloning technique enables the clone and parent vvol to share on-disk blocks of data in a zero-copy fashion, similar to a conventional PCPI, while also allowing for modifications (unlike the conventional PCPI).

Notably, a fundamental property of the cloning technique is that the base PCPI 1235 is common among the clone 1350 and its parent vvol 1205 and, thus, cannot be deleted or freed in the parent vvol while the clone exists. That is, all blocks shared between the clone and its parent vvol are blocks within that base PCPI and, thus, neither may attempt to free or delete those blocks. This restriction also precludes any operation that implicitly makes the PCPI disappear. However, the restriction may be relaxed to allow the clone to "free" the PCPI; freeing of the PCPI requires checking of the owner map 1100 by block free operations on the clone to determine whether the clone or parent owns the block in the aggregate. The clone may only return a block to the aggregate if it owned the block, not if it was inherited from the parent. However in the dual vbn embodiment, reference is made directly to the clone container file 1340 to determine the owner of the block.

Since the modified volinfo block 1352 references physical block locations in the aggregate that cannot be deleted (because they are held down by the base PCPI 1235 in the parent vvol 1205), when the clone 1350 comes online, it functions in a manner similar to that of a snap restore arrangement. That is, the modified volinfo block 1352 of the clone references a PCPI at a particular point in time (i.e. the base PCPI 1235) and the clone restores the state of the active file system as represented by that PCPI. The difference between a clone and a conventional PCPI is that write allocation can be performed on the clone that essentially allows changes to the base PCPI.

When changes are made to the clone (i.e., blocks of the base snapshot 1235), those changes are written out (stored) according to an extended write allocation technique employed by the file system. The extended write allocation technique is described in U.S. Pat. No. 7,430,571 titled, EXTENSION OF WRITE ANYWHERE FILE LAYOUT WRITE ALLOCATION, issued on Sep. 30, 2008. Broadly stated, a write allocator 282 (FIG. 2) selects a pvbn in the aggregate for a newly allocated block and selects a vvbn in the clone for that new block using appropriate block allocation bitmaps for both the pvbn and vvbn spaces. As noted, the container file 1340 on the clone 1350 initially has no data other than the modified volinfo block 1352. As write operations occur into the clone, the file system 280 fills in the level 0 blocks 1376 of the container file 1340 with the changes associated with those write operations.

As further noted, the block allocation bitmaps used by the file system to select the vvbn are inherited from the base PCPI. By inheriting the base PCPI's bitmaps, the file system executing on the clone also inherits the PCPI's vvbn space; any changes made to the clone are thus directed to "empty" or unused blocks in that inherited vvbn space. This avoids any collisions with the blocks in the base PCPI 1235. However, the inherited vvbn space diverges from the vvbn space of the base PCPI at the time the clone is created. Therefore, as changes are made to the clone, the container file 1340 on the clone starts filling in its level 0 blocks in accordance with the extended write allocation technique. Although the base PCPI and clone now have separate vvbn spaces, some of the vvbns that are used in both spaces reference the same physical blocks in the aggregate.

As noted, a parent vvol, such as parent vvol 1205, includes a container file, such as container file 1210, having a plurality of blocks, such as mode 1212, level 1 indirect blocks 1214 and level 0 data blocks 1216. A clone, such as clone 1350, may be created from a base snapshot 1235 of the parent vvol 1205 in accordance with the cloning technique described herein. The parent and clone have the same sized vbn space and, initially, all blocks (other than the modified volinfo block 1352) of container file 1340 of the clone 1350 are shared with the parent vvol 1205 (and/or base snapshot 1235). The clone splitting technique essentially "splits" those shared blocks between the parent vvol (base snapshot) and the clone to thereby enable the clone to become a full fledged, independent volume.

Figure 14:
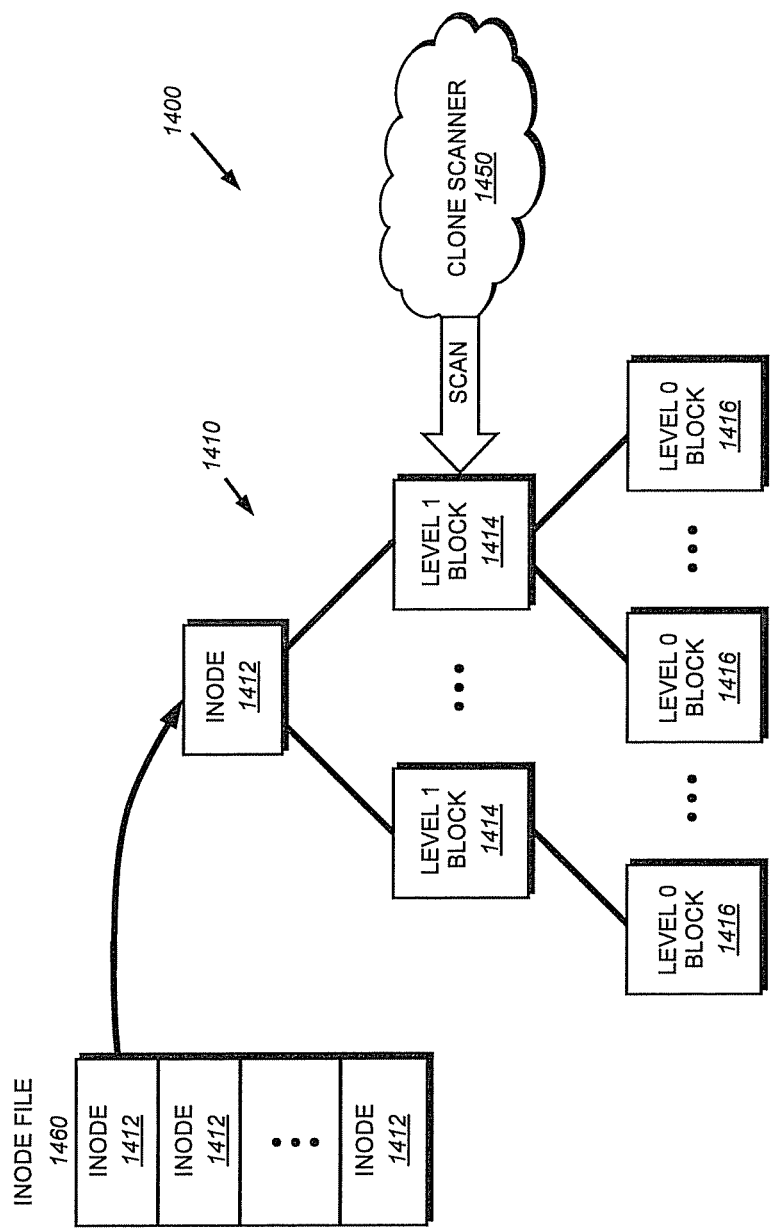
FIG. 14 is a schematic block diagram illustrating a clone splitting technique in accordance with the present invention.

FIG. 14 is a schematic block diagram illustrating an illustrative clone-splitting technique 1400. As also noted, the clone 1350 includes, among other things, an mode file 1360. All modes 1412 of the file system (executing on the clone) are organized into the mode file 1360. Each mode 1412 forms the root of an mode buffer tree 1410 and contains pointers to indirect blocks, such as level 1 (L1) indirect blocks 1414 and each indirect block includes pointers to level 0 (L0) data blocks 1416. A clone scanner 1450 scans (traverses) the entire mode buffer tree 1410 of each mode 1412 and determines whether to initiate writing of a new copy of a block used in the clone to a level 0 data block 1376 of the clone container file 1340; as described herein, this determination is dependent upon whether the block is not owned by the clone. The clone scanner 1450 is illustratively an mode-based file system scanner configured to run over an online volume, such as clone 1450, to thereby enable access to the clone during the shared block splitting procedure.

It should be noted that a clone may be created on a clone (a nesting arrangement of clones). Thus, it is not adequate to check for parent vvol ownership of a block used by the clone. Specifically, the clone splitting technique requires that the block used by the clone not be owned by the clone. Accordingly, the clone scanner 1450 efficiently examines all blocks used in the clone to determine those which are not owned by the clone 1350. Those blocks that are not owned by the clone are copied to the clone (e.g., in accordance with a copy-on-write operation) to essentially "split" the blocks shared between the parent vvol 1205 and clone 1350.

In the illustrative embodiment, the clone splitting technique is implemented as a multi-phase process comprising a first "validity checking" phase, a second "clone split scanner" phase and a third "clean-up" phase. Specifically, the first phase of the clone splitting technique involves checking the validity of the scan, including clone state. Validity checking includes ensuring that there are no pinned PCPI on the clone itself. If there are pinned PCPIs, the split operation procedure is rejected because such an operation removes all snapshots and no pinned snapshots should be removed, e.g., from clones of the clone. If no errors are found, the clone transitions to a persistent "clone_split" state that allows continuation of clone splitting after an unexpected system failure, such as panic or power failure.

Figure 15:
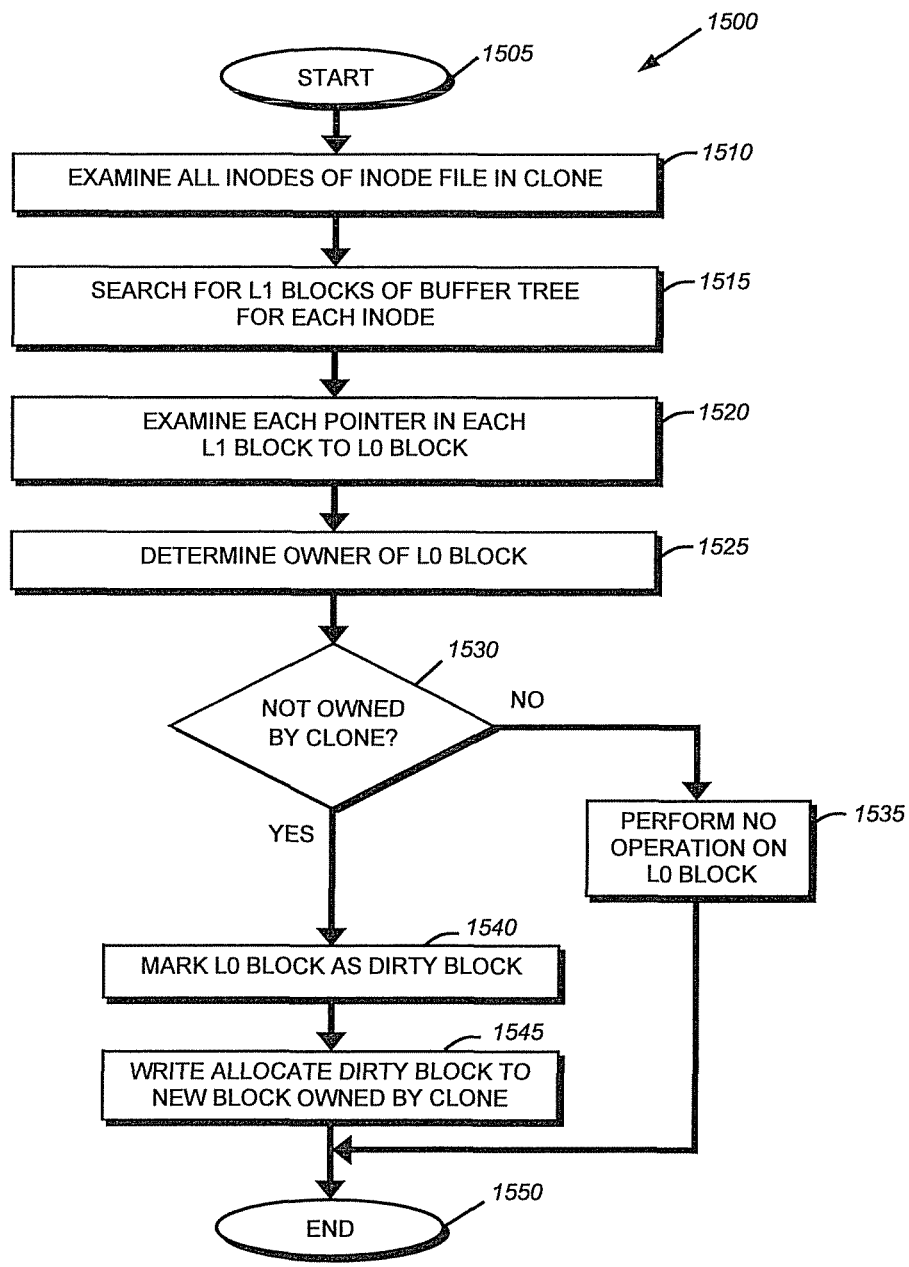
FIG. 15 is a flowchart illustrating a shared block splitting procedure in accordance with the cloning splitting technique.

The second clone split scanner phase of the clone splitting technique comprises the shared block splitting procedure for splitting blocks shared between a clone and parent vvol. FIG. 15 is a flowchart illustrating the shared block splitting procedure 1500. The procedure starts at step 1505 and proceeds to step 1510 where the clone scanner scans (examines) all the modes of the mode file in the clone and, for each inode, "walks" the inode buffer tree searching for L1 blocks (step 1515). Upon discovering each L1 block, in step 1520 the clone scanner examines each pointer in the L1 block to a L0 data block and, in step 1525, determines the owner of that L0 block. The pointers are illustratively physical volume block numbers (pvbns) and the owner map 1100 in the aggregate is illustratively used to determine the owner of a particular pvbn block.

If the owner map 1100 indicates the clone is the owner of the L0 block (step 1530), the clone scanner does not perform any further operation on that data block (step 1535) and the procedure ends at step 1550. However if the owner map indicates that the clone is not the owner of the L0 block, the scanner loads the block into memory 124 (buffer cache 170) and marks it as "dirty" (step 1540). In step 1545, the write allocator 282 of the file system 280 is invoked to write allocate the dirty block to a new block that is owned by the clone. That is, the write allocator performs a copy-on-write operation that essentially loads the dirty block into the new block without altering its data contents, thereby furthering "filling" of the container file 1340 of the clone. The procedure then ends at step 1550.

As can be appreciated, the splitting of blocks shared between a clone and its parent may, in some cases, consume substantial disk storage space (e.g., up to 100% of the clone disk size). For a large vvol, this presents a possibility that the clone splitting technique may fail due to lack of disk space. As noted, previously an administrator would manually estimate the amount of storage space required prior to initiating a clone splitting operation. If that estimate was incorrect and there was not sufficient storage available, not only would the operation fail, but the administrator would not be informed of the failed operation for some time (on the order of hours).

G. Calculation of Storage Required to Split a Clone

The present invention is directed to a system and method for efficiently calculating an estimated amount of storage required to split a clone volume from its parent volume. The system and method is illustratively embodied as a command line interface (CLI) command, i.e., a clone split estimate command, executed by the estimation module 295 of storage system 120. Notably, the estimation module 295 cooperates with the file system 280 to quickly access data structures containing information used to perform the storage calculation without the need to access each block of the clone and parent volumes. To that end, the clone split estimate command is issued through the UI 275 of the storage operating system 200 by a system administrator. The novel command is then processed by the estimation module 295 to generate appropriate file system operations needed to interact with the file system 280.

Figure 16:
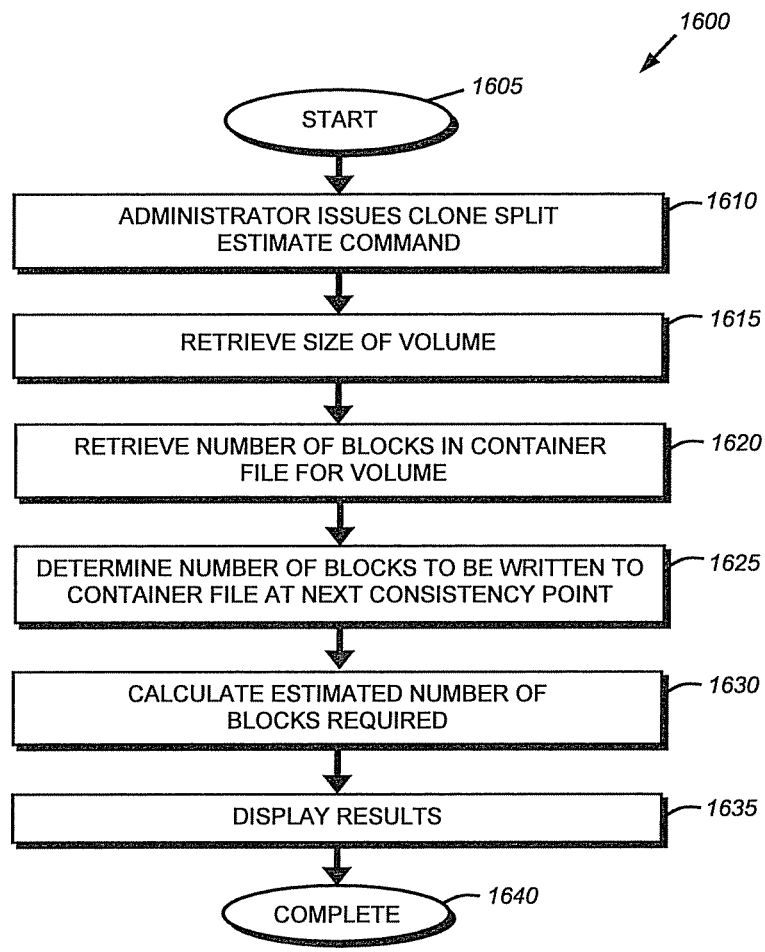
FIG. 16 is a flowchart detailing the steps of a procedure for calculating the amount of storage required to split a clone from its parent in accordance with an embodiment of the present invention.

FIG. 16 is a flowchart detailing the steps of a procedure 1600 for calculating an estimated amount of storage required to perform a clone splitting operation in accordance with an embodiment of the present invention. The procedure 1600 begins in step 1605 and continues to step 1610 where administrator issues the clone split estimate command to the estimation module 295 of storage system 120 illustratively via a CLI of the UI 275. Alternately, the administrator may utilize a graphical user interface (GUI) of the UI 275 to essentially select the novel command for execution by the estimation module 295.

In step 1615, the estimation module 295 processes the command by interacting with the file system 280 to retrieve the size (i.e., the number of blocks) of the clone volume. Illustratively, the clone volume size may be obtained by examining metadata of a file system information data structure, e.g., the fsinfo block 1354, associated with the clone volume 1350. In step 1620, estimation module interacts with the file system 280 to retrieve the number of blocks stored in a container file for the clone volume using, e.g., conventional file system operations directed to the container file 1340 of the clone 1350. Additionally, in an alternate embodiment as indicated in step 1625, the estimation module 295 may access an "in-memory" construct associated with a non-volatile random access memory (not shown) of the storage system 120 to determine the number of blocks to be written to the container file 1340 at a next consistency point, i.e., blocks that are currently in buffer cache 170. Note that these blocks to be written to the container file represent data that has been written to the clone, but not yet committed to disk due to the log structured nature of the file system.

In step 1630, the estimation module 295 calculates the estimated amount of storage required for the clone splitting operation. Illustratively, the estimation module calculates the estimated storage space (i.e., number of blocks) required by subtracting the size (i.e., number of blocks) in the container file from the size (i.e., number of blocks) of the clone volume. For example, if is determined that the clone volume is 800 GB in size and 200 GB of data has been written in the container file, then the amount of space required is approximately 600 GB. Alternately, the calculation may involve subtracting the number of blocks in the container file and the number of blocks to be written to the container file from the number of blocks of the clone. Moreover, a determination may be made to account for the appropriate number of indirect blocks required to accommodate the level 0 data blocks of a certain size.

The result of the calculation thus estimates the amount of storage space required to perform a clone splitting operation, i.e., the number of blocks stored in the parent volume of the clone (or parent's parent, etc.) that must be written during the clone splitting operation. In step 1635, the estimated amount of storage space is displayed to the administrator so that appropriate disk provisioning may occur before the initiation of the clone splitting operation. For example, if the results of procedure 1600 indicate that approximately 600 GB of data will be written during the clone split operation, the administrator can ensure that there is at least 600 GB of disk space available for the split clone operation. The procedure then completes in step 1640.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software (including a computer-readable medium having program instructions executing on a computer), hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A computer implemented method, comprising:
   determining a first amount of data stored in a data container of a clone volume stored on a storage device operatively connected to a computer, the data stored in the data container configured as modified data of the clone volume, the clone volume configured to share unmodified data with a parent volume;
   determining a size of the clone volume by examining metadata of a data structure associated with the clone volume; and
   determining a second amount of the unmodified data shared by the parent volume based on the first amount of data stored in the data container and the size of the clone volume.

2. The computer implemented method of claim 1 wherein the data structure comprises a file system information block.

3. The computer implemented method of claim 1 further comprising displaying the second amount of the unmodified data shared by the parent volume to a user.

4. The computer implemented method of claim 1 further comprising provisioning the computer to accommodate the second amount of the unmodified data shared by the parent volume.

5. The computer implemented method of claim 1 wherein determining the first amount of data stored in the data container further comprises determining a third amount of data to be written to the data container during a consistency point.

6. The computer implemented method of claim 5 wherein determining the first amount of data stored in the data container further comprises subtracting from the size of the clone volume the third amount of data to be written to the data container during the consistency point.

7. The computer implemented method of claim 5 wherein determining the third amount of data to be written to the data container during the consistency point comprises accessing an in-memory construct associated with a memory of the computer.

8. The computer implemented method of claim 1 wherein determining the second amount of the unmodified data shared by the parent volume comprises subtracting the first amount of data stored in the data container from the size of the clone volume.

9. The computer implemented method of claim 1 wherein at least some of the data stored in the data container is configured as data blocks.

10. The computer implemented method of claim 1 wherein the second amount of the unmodified data shared by the parent volume is a fourth amount of storage space required to split the clone volume from the parent volume.

11. A non-transitory computer readable storage medium containing executable program instructions configured to be executed by a processor and further configured to be stored on the computer readable storage medium, the computer readable storage medium comprising:
   program instructions that determine a first amount of data stored in a data container of a clone volume stored on a storage device operatively connected to a computer, the data stored in the data container configured as modified data of the clone volume, the clone volume configured to share unmodified data with a parent volume;
   program instructions that determine a size of the clone volume by examining metadata of a data structure associated with the clone volume; and
   program instructions that determine a second amount of the unmodified data shared by the parent volume based on the first amount of data stored in the data container and the size of the clone volume.

12. The non-transitory computer readable storage medium of claim 11 wherein the data structure comprises a file system information block.

13. The non-transitory computer readable storage medium of claim 11 further comprising program instructions that display the second amount of the unmodified data shared by the parent volume to a user.

14. The non-transitory computer readable storage medium of claim 11 further comprising program instructions that provision the computer to accommodate the second amount of the unmodified data shared by the parent volume.

15. The non-transitory computer readable storage medium of claim 11 wherein the program instructions that determine the first amount of data stored in the data container further comprise program instructions that determine a third amount of data to be written to the data container during a consistency point.

16. The non-transitory computer readable storage medium of claim 15 wherein the program instructions that determine the first amount of data stored in the data container further comprise program instructions that subtract from the size of the clone volume the third amount of data to be written to the data container during the consistency point.

17. The non-transitory computer readable storage medium of claim 15 wherein the program instructions that determine the third amount of data to be written to the data container during the consistency point comprises program instructions that access an in-memory construct associated with a memory of the computer.

18. The non-transitory computer readable storage medium of claim 11 wherein the program instructions that determine the second amount of the unmodified data shared by the parent volume further comprise program instructions that subtract the first amount of data stored in the data container from the size of the clone volume.

19. The non-transitory computer readable storage medium of claim 11 wherein at least some of the data stored in the data container is configured as data blocks.

20. The non-transitory computer readable storage medium of claim 11 wherein the second amount of the unmodified data shared by the parent volume is a fourth amount of storage space required to split the clone volume from the parent volume.

21. A computer data storage system, comprising:
   a processor of the computer data storage system configured to create a clone volume stored on a storage device operatively connected to the computer data storage system, the clone volume comprising a first amount of data stored in a data container of the clone volume, the data stored in the data container configured as modified data of the clone volume, the clone volume configured to share unmodified data with a parent volume;
   the processor further configured to execute a process configured to determine a size of the clone volume by examining metadata of a data structure associated with the clone volume; and
   the processor further configured to determine a second amount of the unmodified data shared by the parent volume based on the first amount of data stored in the data container and the size of the clone volume.

22. The computer data storage system of claim 21 wherein the data structure comprises a file system information block.

23. The computer data storage system of claim 21 further comprising a display operatively connected to the computer data storage system configured to display the second amount of the unmodified data shared by the parent volume to a user.

24. The computer data storage system of claim 21 wherein the process is further configured to determine the first amount of data stored in the data container by determining a third amount of data to be written to the data container during a consistency point.

25. The computer data storage system of claim 24 wherein the process is further configured to access an in-memory construct associated with a memory of the computer data storage system to determine the third amount of data to be written to the data container during a consistency point.

26. The computer data storage system of claim 24 wherein the process is further configured to determine the first amount of data stored in the data container by subtracting from the size of the clone volume the third amount of data to be written to the data container during the consistency point.

27. The computer data storage system of claim 21 wherein the process is further configured to determine the second amount of the unmodified data shared by the parent volume by subtracting the first amount of data stored in the data container from the size of the clone volume.

28. The computer data storage system of claim 21 wherein at least some of the data stored in the data container is configured as data blocks.

29. The computer data storage system of claim 21 wherein the second amount of the unmodified data shared by the parent volume is a fourth amount of storage space required to split the clone volume from the parent volume.

\* \* \* \* \*